United States Patent
Dahlmanns et al.

(10) Patent No.: US 11,117,689 B2
(45) Date of Patent: Sep. 14, 2021

(54) METHOD OF PRODUCING A CONTAINER PRECURSOR, ESPECIALLY FOR A SINGLE DIMENSIONALLY STABLE FOODSTUFF CONTAINER, WITHOUT FOLDING OVER THE CONTAINER PRECURSOR

(71) Applicant: SIG TECHNOLOGY AG, Neuhausen am Rheinfall (DE)

(72) Inventors: Kurt Dahlmanns, Gangelt (DE); Frank Wittling, Frechen (DE); Ulrich Golembek, Coswig (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 129 days.

(21) Appl. No.: 16/304,431

(22) PCT Filed: May 24, 2017

(86) PCT No.: PCT/EP2017/062555
§ 371 (c)(1),
(2) Date: Nov. 26, 2018

(87) PCT Pub. No.: WO2017/202919
PCT Pub. Date: Nov. 30, 2017

(65) Prior Publication Data
US 2019/0144147 A1    May 16, 2019

(30) Foreign Application Priority Data
May 27, 2016    (DE) .......................... 102016209235.9

(51) Int. Cl.
*B65B 3/02* (2006.01)
*B65D 5/56* (2006.01)
(Continued)

(52) U.S. Cl.
CPC .............. *B65B 3/025* (2013.01); *B32B 29/00* (2013.01); *B65D 5/563* (2013.01); *B65D 85/72* (2013.01)

(58) Field of Classification Search
CPC ....................................................... B65B 3/025
(Continued)

(56) References Cited

U.S. PATENT DOCUMENTS 2,220,746 A * 11/1940 Wentz .................... B65D 5/443
229/213
2,379,038 A * 6/1945 Rous ...................... B65D 5/723
229/220
(Continued)

FOREIGN PATENT DOCUMENTS

DE    102004026690 B3    12/2005
WO    19900009926 A2    9/1990
(Continued)

OTHER PUBLICATIONS

International Search Report and Written Opinion issued in International Application No. PCT/EP2017/062555 dated Sep. 13, 2017.
(Continued)

*Primary Examiner* — Anna K Kinsaul
*Assistant Examiner* — Daniel Jeremy Leeds
(74) *Attorney, Agent, or Firm* — Meunier Carlin & Curfman LLC

(57) ABSTRACT

The invention relates to a method comprising, as method steps, a) providing a sheetlike composite comprising, as mutually superposed layers of a layer sequence, from an inner face of the sheet like composite to an outer face of the sheetlike composite i) an inner polymer layer, ii) a barrier layer, and iii) a carrier layer, wherein the sheetlike composite comprises a first longitudinal edge and a further longitudinal edge, wherein the first longitudinal edge lies opposite the
(Continued)

Figure 1:
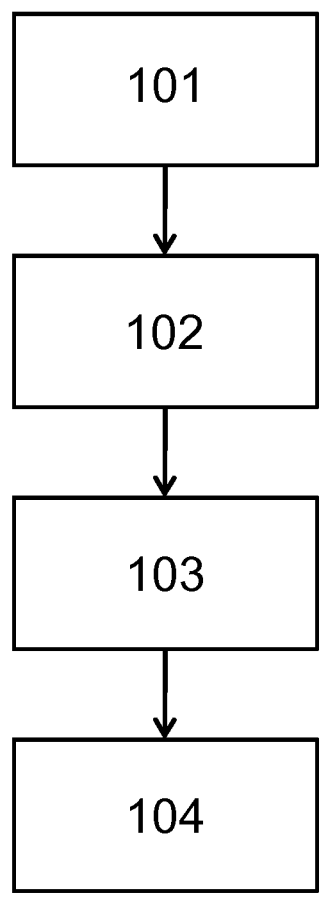

further longitudinal edge, wherein the sheetlike composite includes, in the following sequence in the direction from the first longitudinal edge to the further longitudinal edge: i.a first longitudinal g crease, ii.a second longitudinal crease, iii.a third longitudinal crease, and iv.a fourth longitudinal crease; b) producing a first longitudinal fold characterized by a first internal angle along the first longitudinal crease and a third longitudinal fold characterized by a third internal angle along the third longitudinal crease; c) producing a second longitudinal fold characterized by a second internal angle along the second longitudinal crease and a fourth longitudinal fold characterized by a fourth internal angle along the fourth longitudinal crease; and d) contacting and joining the first longitudinal edge to the further longitudinal edge thereby obtaining a longitudinal seam. The invention further relates to a container precursor and to a closed container, each obtainable by the method, to an apparatus and to a use of the apparatus.

10 Claims, 18 Drawing Sheets

(51) Int. Cl.
 *B32B 29/00* (2006.01)
 *B65D 85/72* (2006.01)
(58) Field of Classification Search
 USPC ..................................................... 229/103.1
 See application file for complete search history.

(56) References Cited

U.S. PATENT DOCUMENTS

| | | | | |
|---|---|---|---|---|
| 2,930,517 A * | 3/1960 | Mensing | ................ | B65D 5/606 229/117.01 |
| 3,280,531 A * | 10/1966 | Meyer-Jagenberg | ........................ | B65D 5/067 53/458 |
| 3,303,985 A * | 2/1967 | Prokes | ................. | B65D 77/283 229/103.1 |
| 3,754,456 A * | 8/1973 | Andrews | ............. | B29C 65/1432 493/274 |
| 3,884,131 A * | 5/1975 | Palsson | ................... | B31B 50/00 493/135 |
| 4,410,128 A * | 10/1983 | Rausing | ................ | B65D 5/065 229/216 |
| 4,446,971 A * | 5/1984 | Wise | ...................... | B65D 5/705 229/103.1 |
| 4,469,542 A * | 9/1984 | Reil | .......................... | B31F 1/10 156/203 |
| 4,516,382 A * | 5/1985 | Nakajima | ............... | B65B 3/025 493/178 |
| 4,790,123 A * | 12/1988 | Ljungstrom | ............ | B65B 65/02 53/458 |
| 5,482,202 A * | 1/1996 | Wen | ..................... | B65D 77/283 220/705 |
| 5,603,200 A * | 2/1997 | Calvano | .................... | B65B 3/02 53/426 |
| 6,116,782 A * | 9/2000 | Arkins | ..................... | B32B 27/08 383/202 |
| 6,431,434 B1* | 8/2002 | Haughton | ............. | B65B 61/205 220/708 |
| 8,066,137 B2 * | 11/2011 | Sanfilippo | ................. | B65B 1/06 220/6 |
| 8,602,242 B2 * | 12/2013 | Sanfilippo | ................ | B65B 1/06 220/6 |
| 9,221,228 B2 | 12/2015 | Wolters et al. | | |
| 10,011,379 B2 | 7/2018 | Baltes et al. | | |
| 2007/0108259 A1* | 5/2007 | Daikyo | ................. | A47G 21/18 229/103.1 |
| 2013/0167484 A1 | 7/2013 | Wolters et al. | | |
| 2014/0242311 A1* | 8/2014 | Wolters | ................... | B32B 3/266 428/35.7 |
| 2014/0260119 A1* | 9/2014 | Baltes | .................. | B65B 43/126 53/492 |

FOREIGN PATENT DOCUMENTS

| | | |
|---|---|---|
| WO | 1991000827 A1 | 1/1991 |
| WO | 1998014317 A1 | 4/1998 |
| WO | 2016/001081 A | 1/2016 |

OTHER PUBLICATIONS

English Translation of Office Action issued for Japanese Application No. 2018-561963, dated May 14, 2021, 4 pages.

* cited by examiner

Figure 2
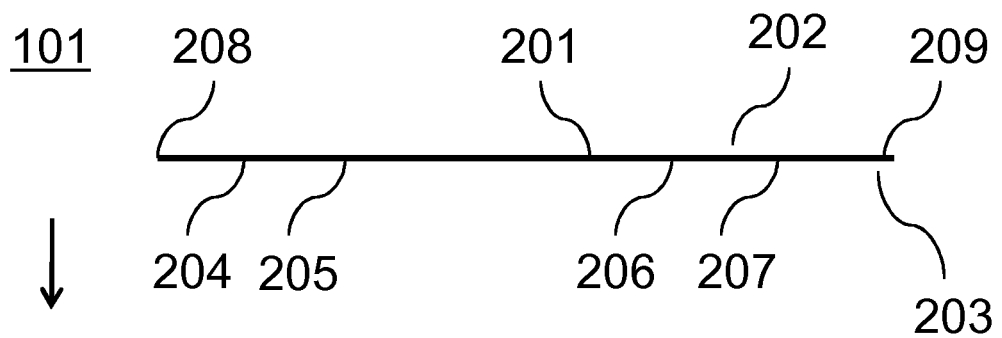
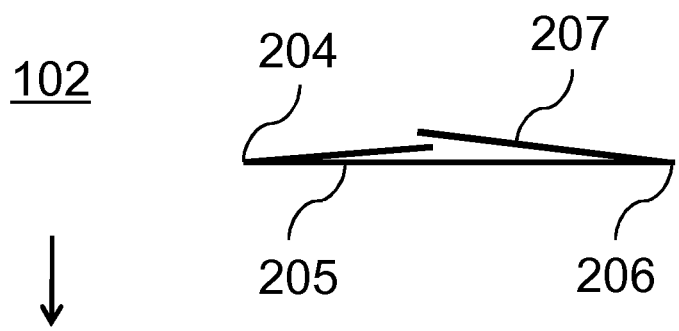
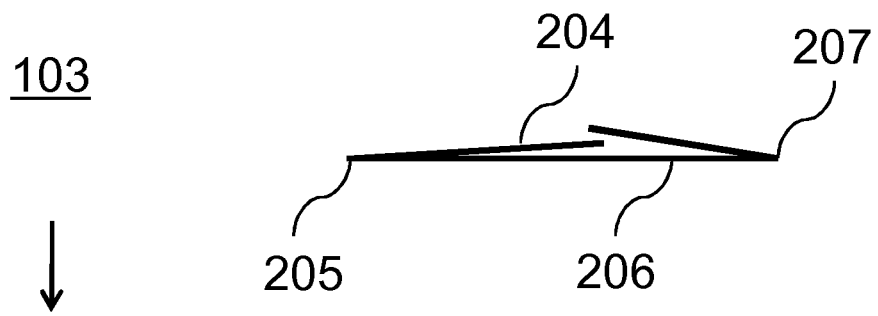
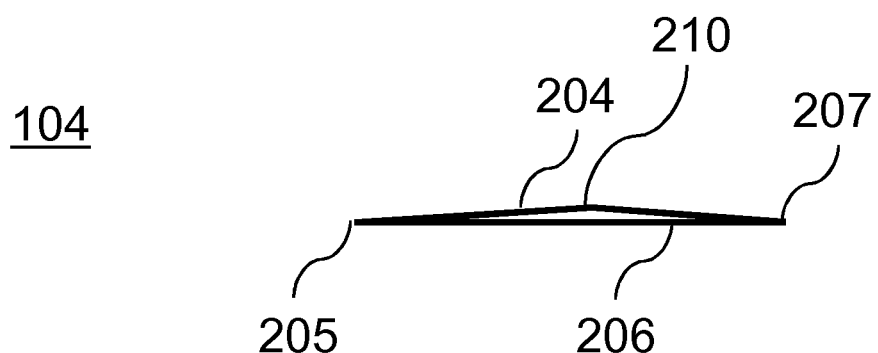

100

100

201

201

704, 802
801

900

900

1100

Figure 15
1500
a) A-A
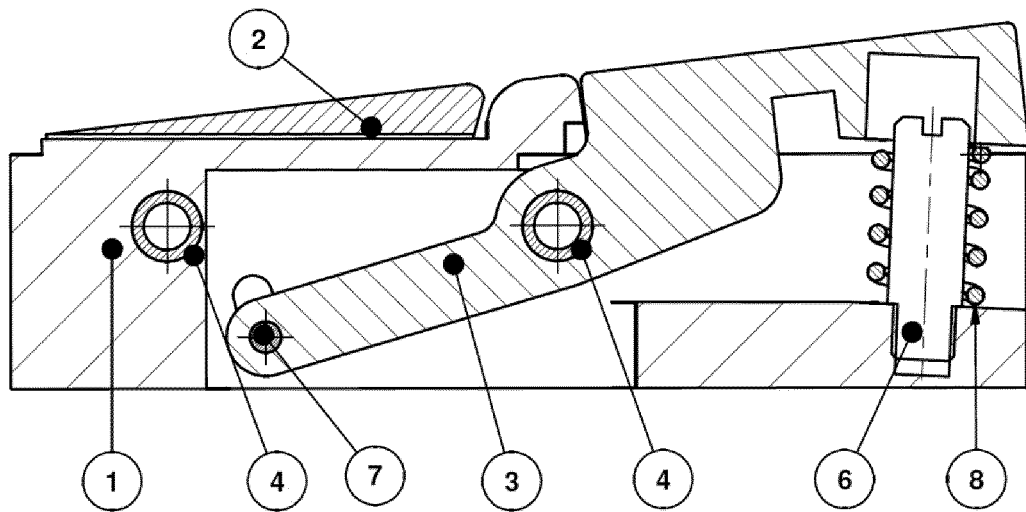
b) B-B
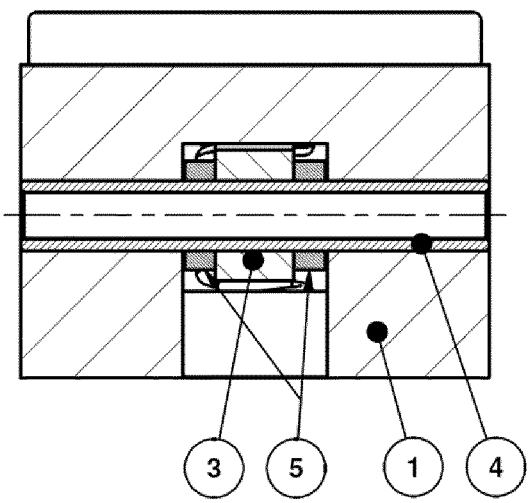

Figure 16
a)
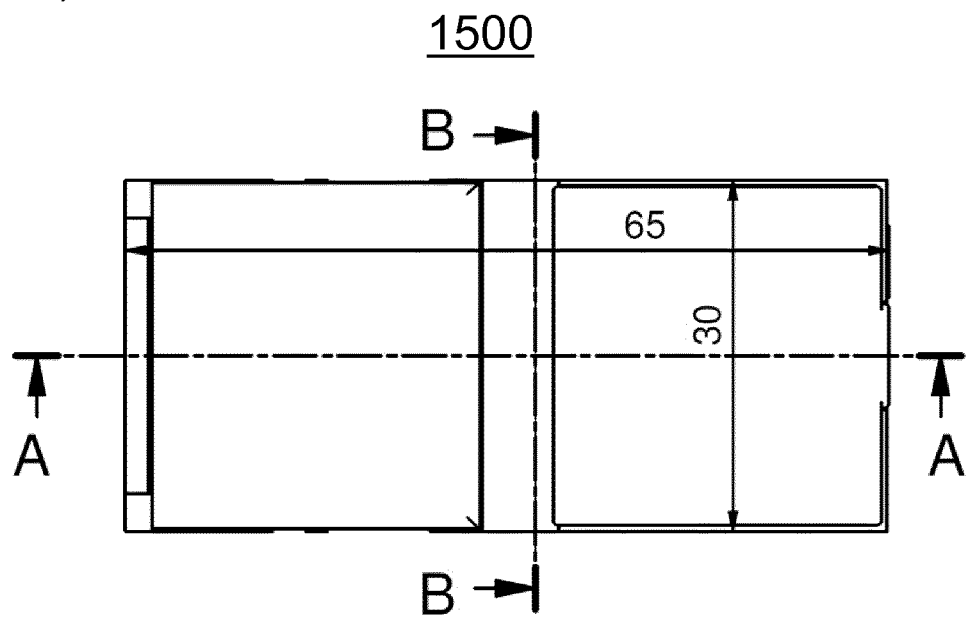
b)
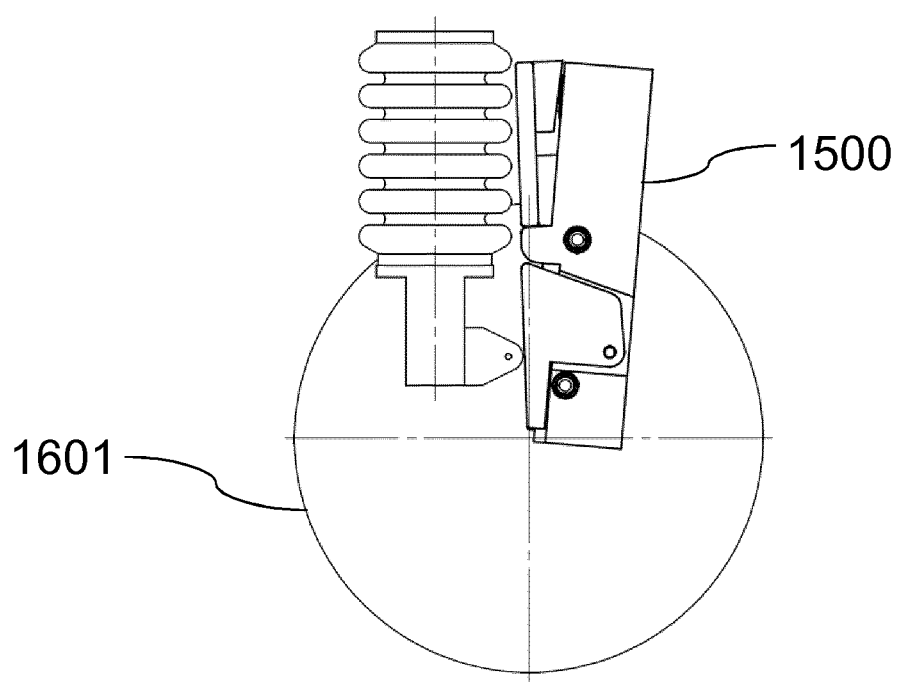

Figure 17
1500
a)
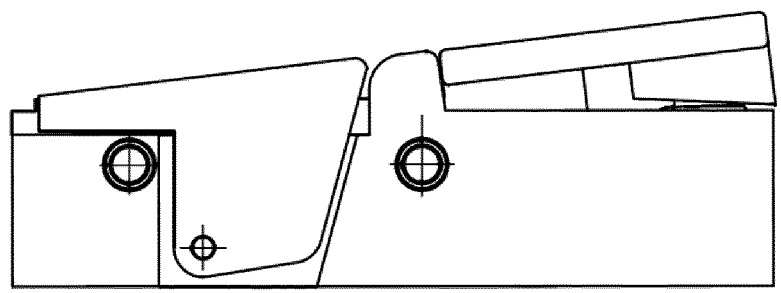
b)
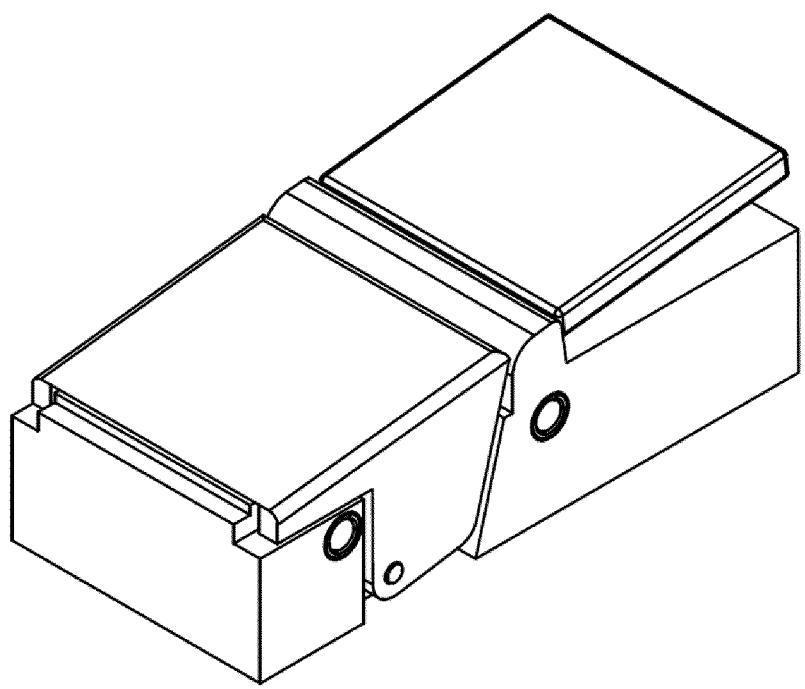

METHOD OF PRODUCING A CONTAINER PRECURSOR, ESPECIALLY FOR A SINGLE DIMENSIONALLY STABLE FOODSTUFF CONTAINER, WITHOUT FOLDING OVER THE CONTAINER PRECURSOR

The present invention relates to a method comprising, as method steps, a) providing a sheetlike composite comprising, as mutually superposed layers of a layer sequence, from an inner face of the sheetlike composite to an outer face of the sheetlike composite
   i) an inner polymer layer,
   ii) a barrier layer, and
   iii) a carrier layer,
   wherein the sheetlike composite comprises a first longitudinal edge and a further longitudinal edge, wherein the first longitudinal edge lies opposite the further longitudinal edge, wherein the sheetlike composite comprises, in the following sequence from the first longitudinal edge to the further longitudinal edge:
      i. a first longitudinal crease,
      ii. a second longitudinal crease,
      iii. a third longitudinal crease, and
      iv. a fourth longitudinal crease;
b) producing a first longitudinal fold along the first longitudinal crease and a third longitudinal fold along the third longitudinal crease, wherein the first longitudinal fold is characterized by a first internal angle, wherein the third longitudinal fold is characterized by a third internal angle;
c) producing a second longitudinal fold along the second longitudinal crease and a fourth longitudinal fold along the fourth longitudinal crease, wherein the second longitudinal fold is characterized by a second internal angle, wherein the fourth longitudinal fold is characterized by a fourth internal angle; and
d) contacting and joining the first longitudinal edge to the further longitudinal edge thereby obtaining a longitudinal seam, wherein the first internal angle, the second internal angle, the third internal angle and the fourth internal angle are each on the inner face of the sheetlike composite. The invention further relates to a container precursor and to a closed container, each obtainable by the method, to an apparatus and to a use of the apparatus.

For some time, foodstuffs, whether they be foodstuffs for human consumption or else animal feed products, have been conserved by storing them either in a can or in a jar closed by a lid. In this case, shelf life can be increased firstly by separately and as much as possible sterilizing the foodstuff and the container in each case, here the jar or can, and then introducing the foodstuff into the container and closing the container. However, these measures of increasing the shelf life of foodstuffs, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for the purpose are recycled, necessitates quite a high expenditure of energy. In the case of jars, an additional aggravating factor is increased expenditure on transport. The jars are usually prefabricated in a glass factory and then have to be transported to the facility where the foodstuffs are dispensed with utilization of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a regular occurrence that broken glass gets into the foodstuff in the course of filling or opening of the filled jars, which can lead in the worst case to internal injuries on consumption of the foodstuff. In addition, both cans and jars have to be labelled for identification and promotion of the foodstuff contents. The jars and cans cannot readily be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, by contrast with film bags, can be regarded as a further development of the aforementioned jars and cans.

In this context, these laminate containers already have many advantages over the conventional jars and cans. Nevertheless, there are also opportunities for improvement in the case of these packaging systems. For instance, container precursors are typically first produced from a laminate blank by a manufacturing method which includes folding and sealing. It has to be possible to transport and store these container precursors in a space-saving manner, and for this reason they are converted to a collapsed, flat state at the early stage of production. These flat-folded container precursors are used, in a further method, to produce containers, which are typically filled and closed in the course of this further method. The processing of the container precursor in the aforementioned further method proceeds in a very substantially automated manner. In this context, a particular aim is faultless running without delays. Faults in the running of the method lead to production of rejects, to production downtime and hence to rising costs, and to increased manual labour and hence also personnel demands in the production. It has been found that non-ideal shaping characteristics of the flat-folded container precursors in particular can result in the aforementioned faults in the running of production.

These shaping characteristics of the flat-folded container precursor are determined to a crucial degree by the method by which the container precursor is formed from the laminate blank of the container precursors. The aim here is to optimally select various folding operations and to coordinate them with one another in the sequence such that a container precursor with suitable shaping characteristics can be obtained by forming a longitudinal seam. In the prior art, DE 10 2004 026 690 B3 teaches a conventional apparatus for folding of side flaps of the laminate blank. After folding, these side flaps are joined to one another thereby forming the longitudinal seam. Thus, DE 10 2004 026 690 B3 specifically discloses a minimum degree of folding operations needed to enable the production of a longitudinal seam and hence a container precursor. The process according to the invention proceeds therefrom and improves on the prior art by means of further folding operations and the execution and mutual coordination thereof. The aim here is not just to provide a method of producing a container precursor with suitable shaping characteristics, but also to configure the method such that it enables economically and technically impeccable manufacture.

In general terms, it is an object of the present invention to at least partly overcome a drawback which arises from the prior art. It is a further object of the invention to provide a container precursor for laminate foodstuff containers which is notable for improved processability, preferably for improved shaping characteristics. It is a further object of the invention to provide a container precursor for laminate foodstuff containers which leads to fewer faults in container production, preferably in a filling machine. It is a further object of the invention to provide a container precursor which can reduce downtime of a filling machine. It is a further object of the invention to provide a container precursor for laminate foodstuff containers which can be shaped more reliably and with fewer faults and placed onto a mandrel wheel. It is a further object of the invention to provide a container precursor for laminate foodstuff containers which can be stacked in a maximum number in an outer package. It is a further object of the invention to provide a container precursor having a combination of the aforementioned advantages. It is a further object of the invention to provide a method of producing a container precursor having one of or a combination of several of the aforementioned advantages. It is a further object of the invention to provide the aforementioned method, wherein the method is performable at minimum cost, in an as much as possible space-saving manner, with minimum noise nuisance, in a very energy-saving manner, with maximum occupational safety, with maximum productivity or with minimum wear, or with a combination of the aforementioned features. It is a further object of the invention to reduce production faults and stoppages in container manufacture.

A contribution to at least partial achievement of at least one of the above objects is made by the independent claims. The dependent claims provide preferred embodiments which contribute to at least partial achievement of at least one of the objects.

A contribution to the achievement of at least one of the objects of the invention is made by an embodiment 1 of a method comprising, as method steps,
 a) providing a sheetlike composite comprising, as mutually superposed layers of a layer sequence, from an inner face of the sheetlike composite to an outer face of the sheetlike composite
  i) an inner polymer layer,
  ii) a barrier layer, and
  iii) a carrier layer,
  wherein the sheetlike composite comprises a first longitudinal edge and a further longitudinal edge, wherein the first longitudinal edge lies opposite the further longitudinal edge, wherein the sheetlike composite comprises, in the following sequence from the first longitudinal edge to the further longitudinal edge:
   i. a first longitudinal crease,
   ii. a second longitudinal crease,
   iii. a third longitudinal crease, and
   iv. a fourth longitudinal crease;
 b) producing a first longitudinal fold along the first longitudinal crease and a third longitudinal fold along the third longitudinal crease, wherein the first longitudinal fold is characterized by a first internal angle, wherein the third longitudinal fold is characterized by a third internal angle;
 c) producing a second longitudinal fold along the second longitudinal crease and a fourth longitudinal fold along the fourth longitudinal crease, wherein the second longitudinal fold is characterized by a second internal angle, wherein the fourth longitudinal fold is characterized by a fourth internal angle; and
 d) contacting and joining the first longitudinal edge to the further longitudinal edge thereby obtaining a longitudinal seam,
wherein the first internal angle, the second internal angle, the third internal angle and the fourth internal angle are each on the inner face of the sheetlike composite. In this method, the production of the first longitudinal fold and the third longitudinal fold in method step b) may be successive, overlap in time or be simultaneous. In addition, the production of the second longitudinal fold and the fourth longitudinal fold in method step c) may be successive, overlap in time or be simultaneous.

Preferably, in method step d), a container precursor is obtained in a first flat-folded state. Further preferably, the container precursor can be converted to a further flat-folded state by folding along the first to fourth longitudinal creases, although the method according to the invention preferably does not include this conversion. The conversion of the container precursor from the first flat-folded state to the further flat-folded state is also referred to as folding over. In the first flat-folded state, the second internal angle and the fourth internal angle are each not more than 15°, preferably not more than 10°, more preferably not more than 8°, more preferably not more than 5°, more preferably not more than 3°, more preferably not more than 1°, most preferably 0°, and the first internal angle and the third internal angle are each at least 165°, preferably at least 170°, more preferably at least 172°, more preferably at least 174°, more preferably at least 176°, more preferably at least 178°, most preferably 180°. In the further flat-folded state, the first internal angle and the third internal angle are each not more than 15°, preferably not more than 10°, more preferably not more than 8°, more preferably not more than 5°, more preferably not more than 3°, more preferably not more than 1°, most preferably 0°, and the second internal angle and the fourth internal angle are each at least 165°, preferably at least 170°, more preferably at least 172°, more preferably at least 174°, more preferably at least 176°, more preferably at least 178°, most preferably 180°. In a further configuration of the method which is preferred in accordance with the invention, in method step d), a container precursor is obtained in the first flat-folded state, wherein the container precursor can be folded over to the further flat-folded state, wherein the container precursor is not folded over for at least 1 hour, preferably at least 2 hours, preferably at least 3 hours, more preferably at least 10 hours, more preferably at least 24 hours, more preferably at least 3 days, more preferably at least 5 days, most preferably at least 14 days. In a further configuration of the method which is preferred in accordance with the invention, in method step d), a container precursor is obtained in the first flat-folded state, wherein the container precursor can be folded over to the further flat-folded state, wherein the container precursor is not folded over prior to packing of the container precursor after method step d).

In one embodiment 2 of the invention, the method is configured according to embodiment 1, wherein the method is a method of producing a sleeve-like container precursor for a single container.

In one embodiment 3 of the invention, the method is configured according to embodiment 1 or 2, wherein the production of the first longitudinal fold in method step b) comprises reducing the first internal angle to not more than 15°, preferably to not more than 10°, more preferably to not more than 8°, more preferably to not more than 5°, more preferably to not more than 3°, more preferably to not more than 1°, most preferably to 0°. In this case, reducing the first internal angle to 0° preferably comprises pressing fold regions of the sheetlike composite that adjoin the first longitudinal crease together. Preferably, the first internal angle in method step b), after the production of the first longitudinal fold, is increased to at least 165°, preferably to at least 170°, more preferably to at least 172°, more preferably to at least 174°, more preferably to at least 176°, more preferably to at least 178°, most preferably to 180°.

In one embodiment 4 of the invention, the method is configured according to any of the preceding embodiments, wherein the production of the third longitudinal fold in method step b) comprises reducing the third internal angle to not more than 15°, preferably to not more than 10°, more preferably to not more than 8°, more preferably to not more than 5°, more preferably to not more than 3°, more preferably to not more than 1°, most preferably to 0°. In this case, reducing the third internal angle to 0° preferably comprises pressing fold regions of the sheetlike composite that adjoin the third longitudinal crease together. Preferably, the third internal angle is increased in method step c) to at least 165°, preferably to at least 170°, more preferably to at least 172°, more preferably to at least 174°, more preferably to at least 176°, more preferably to at least 178°, most preferably to 180°. This is preferably the case when, in method step c), the fourth longitudinal fold is produced by increasing the fourth internal angle to at least 190°, preferably to at least 200°, more preferably to at least 210°, most preferably to at least 220°. In a further embodiment of the invention, the third internal angle is increased in method step b) to at least 165°, preferably to at least 170°, more preferably to at least 172°, more preferably to at least 174°, more preferably to at least 176°, more preferably to at least 178°, most preferably to 180°, after the third internal angle has been reduced as described above. This is preferably the case when, in method step c), the fourth longitudinal fold is produced by reducing the fourth internal angle to not more than 15°, preferably to not more than 10°, more preferably to not more than 8°, more preferably to not more than 5°, more preferably to not more than 3°, more preferably to not more than 1°, most preferably to 0°. Further preferably, the third internal angle is increased to at least 165°, preferably to at least 170°, more preferably to at least 172°, more preferably to at least 174°, more preferably to at least 176°, more preferably to at least 178°, most preferably to 180°, after the first internal angle has been increased to at least 165°, preferably to at least 170°, more preferably to at least 172°, more preferably to at least 174°, more preferably to at least 176°, more preferably to at least 178°, most preferably to 180°.

In one embodiment 5 of the invention, the method is configured according to any of the preceding embodiments, wherein the production of the fourth longitudinal fold in method step c) comprises increasing the fourth internal angle to at least 190°, preferably to at least 200°, more preferably to at least 210°, most preferably to at least 220°. Preferably, the fourth internal angle is increased to at least 190°, preferably to at least 200°, more preferably to at least 210°, most preferably to at least 220°, before the third internal angle is increased to at least 165°, preferably to at least 170°, more preferably to at least 172°, more preferably to at least 174°, more preferably to at least 176°, more preferably to at least 178°, most preferably to 180°.

In one embodiment 6 of the invention, the method is configured according to any of the preceding embodiments, wherein the production of the second longitudinal fold in method step c) comprises reducing the second internal angle to not more than 15°, preferably to not more than 10°, more preferably to not more than 8°, more preferably to not more than 5°, more preferably to not more than 3°, more preferably to not more than 1°, most preferably to 0°. In this case, reducing the second internal angle to 0° preferably comprises pressing fold regions of the sheetlike composite that adjoin the second longitudinal crease together.

In one embodiment 7 of the invention, the method is configured according to any of the preceding embodiments, wherein in method step c) the fourth internal angle is reduced to not more than 15°, preferably to not more than 10°, more preferably to not more than 8°, more preferably to not more than 5°, more preferably to not more than 3°, more preferably to not more than 1°, most preferably to 0°. In this case, reducing the fourth internal angle to 0° preferably comprises pressing fold regions of the sheetlike composite that adjoin the fourth longitudinal crease together. Preferably, the fourth internal angle is reduced to not more than 15°, preferably to not more than 10°, more preferably to not more than 8°, more preferably to not more than 5°, more preferably to not more than 3°, more preferably to not more than 1°, most preferably to 0°, after the fourth longitudinal fold has been produced by increasing the fourth internal angle to at least 190°, preferably to at least 200°, more preferably to at least 210°, most preferably to at least 220°. In a further embodiment of the invention, the fourth longitudinal fold is produced in method step c) by reducing the fourth internal angle to not more than 15°, preferably to not more than 10°, more preferably to not more than 8°, more preferably to not more than 5°, more preferably to not more than 3°, more preferably to not more than 1°, most preferably to 0°.

In one embodiment 8 of the invention, the method is configured according to any of the preceding embodiments, wherein the sheetlike composite further includes an outer polymer layer, wherein the outer polymer layer is superposed on the carrier layer on a side of the carrier layer remote from the barrier layer. Further preferably, the outer polymer layer is superposed by a colour layer, preferably a decoration, on a side of the outer polymer layer remote from the carrier layer. The colour layer preferably comprises at least one colourant.

In one embodiment 9 of the invention, the method is configured according to any of the preceding embodiments, wherein the sheetlike composite is a blank for production of a single container.

In one embodiment 10 of the invention, the method is configured according to any of the preceding embodiments, wherein the method comprises, as method sub-steps of method step a),
  A) providing a sheetlike composite precursor comprising, as mutually superposed layers of a layer sequence, from an inner face of the sheetlike composite precursor to an outer face of the sheetlike composite precursor
    i) the inner polymer layer,
    ii) the barrier layer, and
    iii) the carrier layer; and B) creasing the sheetlike composite precursor thereby obtaining the sheetlike composite.

Creasing in method sub-step B) is preferably effected with a creasing tool.

In one embodiment 11 of the invention, the method is configured according to embodiment 10, wherein the sheetlike composite precursor is a blank for manufacture of a single container.

In one embodiment 12 of the invention, the method is configured according to any of the preceding embodiments, wherein the carrier layer of the sheetlike composite comprises an oriented material, wherein the oriented material is characterized by a direction of orientation, wherein the direction of orientation forms an angle of orientation with a longitudinal crease selected from the group consisting of the first longitudinal crease, the second longitudinal crease, the third longitudinal crease and the fourth longitudinal crease, or with a combination of at least two thereof, wherein the angle of orientation is in a range from 60 to 120°, preferably from 70 to 110°, more preferably from 75 to 105°, more preferably from 80 to 100°, most preferably from 85 to 95°. A preferred oriented material is one selected from the group consisting of cardboard, paperboard and paper or a combination of at least two thereof. A preferred direction of orientation is a direction of a majority of fibres of the oriented material. The carrier layer preferably consists of the oriented material.

In one embodiment 13 of the invention, the method is configured according to any of the preceding embodiments, wherein, in method step b), the carrier layer is split along the first longitudinal crease into at least 2, preferably at least 3, more preferably at least 4, sublayers at least partly separated from one another. In a further preferred embodiment, the carrier layer, in method step b), is split along the third longitudinal crease, or along the third longitudinal crease and along the first longitudinal crease, into at least 2, preferably at least 3, more preferably at least 4, sublayers at least partly separated from one another.

In one embodiment 14 of the invention, the method is configured according to any of the preceding embodiments, wherein, in method step c), the carrier layer is split along the second longitudinal crease or along the fourth longitudinal crease or along each into at least 2, preferably at least 3, more preferably at least 4, sublayers at least partly separated from one another. In a further preferred embodiment, the carrier layer, in method step c), in addition to the above, is split along the third longitudinal crease into at least 2, preferably at least 3, more preferably at least 4, sublayers at least partly separated from one another.

In one embodiment 15 of the invention, the method is configured according to any of the preceding embodiments, wherein, in method step b), a cavity is produced in the carrier layer along the first longitudinal crease. In a further preferred embodiment, in the carrier layer, in method step b), a cavity is produced along the third longitudinal crease, or along the third longitudinal crease and along the first longitudinal crease.

In one embodiment 16 of the invention, the method is configured according to any of the preceding embodiments, wherein, in method step c), a cavity is produced in the carrier layer along the second longitudinal crease or along the fourth longitudinal crease or along each. In a further preferred embodiment, a cavity is produced in the carrier layer in method step c), in addition to the above, along the third longitudinal crease.

In one embodiment 17 of the invention, the method is configured according to any of the preceding embodiments, wherein the barrier layer comprises, preferably consists of, one selected from the group consisting of a plastic, a metal and a metal oxide, or a combination of at least two thereof.

In one embodiment 18 of the invention, the method is configured according to any of the preceding embodiments, wherein the inner polymer layer comprises a polymer prepared by means of a metallocene catalyst to an extent of 10% to 90% by weight, preferably to an extent of 25% to 90% by weight, more preferably to an extent of 30% to 80% by weight, based on the total weight of the inner polymer layer.

In one embodiment 19 of the invention, the method is configured according to any of embodiments 1 to 17, wherein the inner polymer layer comprises a polymer blend, wherein the polymer blend comprises an mPE to an extent of 10% to 90% by weight, preferably to an extent of 25% to 90% by weight, more preferably to an extent of 30% to 80% by weight, and a further polymer to an extent of at least 10% by weight, preferably to an extent of at least 15% by weight, more preferably to an extent of at least 20% by weight, based in each case on the total weight of the polymer blend.

In one embodiment 20 of the invention, the method is configured according to any of the preceding embodiments, wherein the carrier layer comprises, preferably consists of, one selected from the group consisting of cardboard, paperboard and paper, or a combination of at least two thereof.

In one embodiment 21 of the invention, the method is configured according to any of the preceding embodiments, wherein the carrier layer has at least one hole, wherein the hole is covered at least by the barrier layer and at least by the inner polymer layer as hole-covering layers.

In one embodiment 22 of the invention, the method is configured according to any of the preceding embodiments, wherein a container precursor is obtained in method step d), wherein the method comprises, as further method steps,
  e) forming a base region of the container precursor by folding the sheetlike composite;
  f) closing the base region;
  g) filling the container precursor with a foodstuff; and
  h) closing the container precursor in a top region thereby obtaining a closed container.

The closing in method step f) or h) or in both is preferably effected by joining of regions of the sheetlike composite. A preferred joining method is sealing. The closed container preferably does not comprise any lid or base, or either, that has not been formed in one piece with the sheetlike composite. The method preferably includes, between method steps d) and e), shaping of the container precursor, and preferably further comprises placing of the shaped container precursor onto a mandrel, preferably of a mandrel wheel. Preferably, method steps e) to h) are conducted in a filling machine. A preferred filling machine comprises a mandrel wheel.

In one embodiment 23 of the invention, the method is configured according to embodiment 22, wherein at least part of the sheetlike composite during the folding in method step e) has a temperature in a range from 10 to 50° C., preferably from 15 to 40° C., more preferably from 16 to 30° C., most preferably from 18 to 25° C.

In one embodiment 24 of the invention, the method is configured according to embodiment 22 or 23, wherein the closing in method step f) or h) or in both comprises a sealing, wherein the sealing is effected by means of a method selected from the group consisting of irradiation, contacting with a hot solid, inducement of a mechanical vibration and contacting with a hot gas, or by a combination of at least two of these. In this case, it is possible to use a different sealing method from the aforementioned group in method step f) from that in method step h) and vice versa.

In one embodiment 25 of the invention, the method is configured according to any of embodiments 22 to 24, wherein the method further comprises a method step j), wherein the closed container is joined to an opening aid in method step j). Preferably, the closed container is joined to the opening aid in such a way that the opening aid covers a hole in the carrier layer. A preferred opening aid is a cutting tool, for example a cutting ring. Further preferably, the opening aid may include a lid.

A contribution to the fulfilment of at least one of the objects of the invention is made by an embodiment 1 of a container precursor obtainable by the method according to any of embodiments 1 to 21. A preferred container precursor takes the form of a sleeve.

In one embodiment 2 of the invention, the container precursor is configured according to embodiment 1, wherein the first internal angle and the third internal angle are each at least 165°, preferably at least 170°, more preferably at least 172°, more preferably at least 174°, more preferably at least 176°, more preferably at least 178°, most preferably 180°; wherein the second internal angle and the fourth internal angle are each not more than 15°, preferably not more than 10°, more preferably not more than 8°, more preferably not more than 5°, more preferably not more than 3°, more preferably not more than 1°, most preferably 0°; wherein the container precursor can be shaped by folding along the first longitudinal crease, the second longitudinal crease, the third longitudinal crease and the fourth longitudinal crease to give a sleeve structure; wherein the container precursor is characterized by a shaping coefficient according to the test method described herein in a range from 8 to 30 m$^2$/kg, preferably from 8.5 to 28 m$^2$/kg, more preferably from 9 to 27 m$^2$/kg, more preferably from 9.5 to 26.5 m$^2$/kg, most preferably from 10 to 26.5 m$^2$/kg.

Preferably, the first to fourth internal angles have been obtained as described above by the method according to any of embodiments 1 to 21 of the method according to the invention and not altered thereafter by more than 1°, preferably not by more than 0.5°. Accordingly, the first to fourth internal angles, after manufacture of the container precursor according to any of embodiments 1 to 21 of the method according to the invention, have preferably not been manipulated by folding. The container precursor is preferably folded flat, wherein the container precursor preferably has a thickness of less than 10 mm, more preferably less than 8 mm, more preferably less than 5 mm, most preferably less than 4 mm. Further preferably, the container precursor is in one-piece form.

A contribution to the fulfillment of at least one of the objects of the invention is made by an embodiment 1 of a closed container obtainable by the method according to any of embodiments 22 to 25. Preferably, the closed container does not comprise any lid or base, or either, that has not been formed in one piece with the sheetlike composite. A preferred closed container comprises a foodstuff.

A contribution to the fulfillment of at least one of the objects of the invention is made by an embodiment 1 of an apparatus comprising, as constituents,
 a) a sheetlike composite comprising, as mutually superposed layers of a layer sequence, from an inner face of the sheetlike composite to an outer face of the sheetlike composite
  i) an inner polymer layer,
  ii) a barrier layer, and
  iii) a carrier layer,
   wherein the sheetlike composite comprises a first longitudinal edge and a further longitudinal edge, wherein the first longitudinal edge lies opposite the further longitudinal edge, wherein the sheetlike composite comprises, in the following sequence from the first longitudinal edge to the further longitudinal edge:
   i. a first longitudinal crease,
   ii. a second longitudinal crease,
   iii. a third longitudinal crease, and
   iv. a fourth longitudinal crease;
 b) a transport unit designed to transport the sheetlike composite in a transport direction;
 c) a first folding station designed to produce a first longitudinal fold along the first longitudinal crease, wherein the first longitudinal fold is characterized by a first internal angle;
 d) a second folding station designed to produce a third longitudinal fold along the third longitudinal crease, wherein the third longitudinal fold is characterized by a third internal angle;
 e) a third folding station designed to fold along a fourth longitudinal fold along the fourth longitudinal crease, wherein the fourth longitudinal fold is characterized by a fourth internal angle, wherein the third folding station is arranged beyond the second folding station in the transport direction;
 f) a fourth folding station designed to produce a second longitudinal fold along the second longitudinal crease, wherein the second longitudinal fold is characterized by a second internal angle, wherein the fourth folding station is arranged beyond the second folding station in the transport direction; and
 g) a longitudinal seam-forming station designed to contact and join the first longitudinal edge to the further longitudinal edge thereby obtaining a longitudinal seam, wherein the longitudinal seam-forming station is arranged beyond the fourth folding station in the transport direction,
wherein the first internal angle, the second internal angle, the third internal angle and the fourth internal angle are each on the inner face of the sheetlike composite. In a preferred embodiment, the third folding station is designed to produce the fourth longitudinal fold along the fourth longitudinal crease. A preferred transport direction at least partly takes the form of a conveyor belt or a roll conveyor or both. A preferred longitudinal seam-forming station is a sealing station, preferably designed for sealing as described herein.

In one embodiment 2 of the invention, the apparatus is configured according to embodiment 1, wherein the apparatus further comprises a fifth folding station designed to produce the fourth longitudinal fold along the fourth longitudinal crease, wherein the fifth folding station is arranged before the third folding station in the transport direction. In addition, the fifth folding station may be arranged beyond, before or overlapping with the first folding station in the transport direction.

In one embodiment 3 of the invention, the apparatus is configured according to embodiment 1 or 2, wherein the first folding station at least partly comprises a belt, wherein the belt rotates about its longitudinal axis along the transport direction for folding of the sheetlike composite along the first longitudinal crease. A preferred belt is a continuous revolving belt.

In one embodiment 4 of the invention, the apparatus is configured according to any of embodiments 1 to 3, wherein the second folding station at least partly comprises a belt, wherein the belt rotates about its longitudinal axis along the transport direction for folding of the sheetlike composite along the third longitudinal crease. A preferred belt is a continuous revolving belt.

In one embodiment 5 of the invention, the apparatus is configured according to any of embodiments 1 to 4, wherein a folding station selected from the group consisting of the first folding station, the second folding station, the third folding station and the fourth folding station, or a combination of at least two thereof, each comprises one and preferably two rotating roll(s). Preferably, a folding station selected from the group consisting of the first folding station, the second folding station, the third folding station and the fourth folding station, or a combination of at least two thereof, each comprises two rolls rotating in opposite senses, the rolls having been arranged and designed so as to compress a longitudinal fold of the sheetlike composite.

In one embodiment 6 of the invention, the apparatus is configured according to any of embodiments 1 to 5, wherein a longitudinal crease selected from the group consisting of the first longitudinal crease, the second longitudinal crease, the third longitudinal crease and the fourth longitudinal crease, or a combination of at least two thereof, forms an angle with the transport direction in a range from 0 to 30°, preferably from 0 to 20°, more preferably from 0 to 15°, more preferably from 0 to 10°, more preferably from 0 to 7°, more preferably from 0 to 5°, most preferably from 0 to 3°.

In one embodiment 7 of the invention, the apparatus is configured according to any of embodiments 1 to 6, wherein the carrier layer of the sheetlike composite comprises an oriented material, wherein the oriented material is characterized by a direction of orientation, wherein the direction of orientation forms an angle with the transport direction in a range from 60 to 120°, preferably from 70 to 110°, more preferably from 75 to 105°, more preferably from 80 to 100°, most preferably from 85 to 95°. A preferred oriented material is one selected from the group consisting of cardboard, paperboard and paper or a combination of at least two of these. A preferred direction of orientation is a direction of a plurality of fibres of the oriented material. The carrier layer preferably consists of the oriented material.

In one embodiment 8 of the invention, the apparatus is configured according to any of embodiments 1 to 7, wherein the first folding station is designed to reduce the first internal angle to not more than 15°, preferably to not more than 10°, more preferably to not more than 8°, more preferably to not more than 5°, more preferably to not more than 3°, more preferably to not more than 1°, most preferably to 0°, wherein the second folding station is designed to reduce the third internal angle to not more than 15°, preferably to not more than 10°, more preferably to not more than 8°, more preferably to not more than 5°, more preferably to not more than 3°, more preferably to not more than 1°, most preferably to 0°, wherein the third folding station is designed to reduce the fourth internal angle to not more than 15°, preferably to not more than 10°, more preferably to not more than 8°, more preferably to not more than 5°, more preferably to not more than 3°, more preferably to not more than 1°, most preferably to 0°, wherein the fourth folding station is designed to reduce the second internal angle to not more than 15°, preferably to not more than 10°, more preferably to not more than 8°, more preferably to not more than 5°, more preferably to not more than 3°, more preferably to not more than 1°, most preferably to 0°.

In one embodiment 9 of the invention, the apparatus is configured according to any of embodiments 2 to 8, wherein the fifth folding station is designed to increase the fourth internal angle to at least 190°, preferably to at least 200°, more preferably to at least 210°, most preferably to at least 220°.

In one embodiment 10 of the invention, the apparatus is configured according to any of embodiments 1 to 9, wherein a container precursor comprising the sheetlike composite is producible by the apparatus; wherein the first internal angle and the third internal angle in the container precursor are each at least 165°, preferably at least 170°, more preferably at least 172°, more preferably at least 174°, more preferably at least 176°, more preferably at least 178°, most preferably 180°; wherein the second internal angle and the fourth internal angle in the container precursor are each not more than 15°, preferably not more than 10°, more preferably not more than 8°, more preferably not more than 5°, more preferably not more than 3°, more preferably not more than 1°, most preferably 0°, wherein the container precursor can be shaped by folding along the first longitudinal crease, the second longitudinal crease, the third longitudinal crease and the fourth longitudinal crease to give a sleeve structure; wherein the container precursor is characterized by a shaping coefficient according to the test method described herein in a range from 8 to 30 $m^2/kg$, preferably from 8.5 to 28 $m^2/kg$, more preferably from 9 to 27 $m^2/kg$, more preferably from 9.5 to 26.5 $m^2/kg$, most preferably from 10 to 26.5 $m^2/kg$.

A contribution to the fulfillment of at least one of the objects of the invention is made by an embodiment 1 of a use of the apparatus according to any of embodiments 1 to 10 for production of a container precursor.

Features described as preferred in one category of the invention are likewise preferred in any embodiment of the further categories of the invention.

Layers

Two layers have been joined to one another when their adhesion to one another extends beyond van der Waals attraction forces. Layers joined to one another are preferably layers selected from the group consisting of mutually sealed, mutually glued and mutually compressed layers, or a combination of at least two thereof. Unless stated otherwise, in a layer sequence, the layers may follow one another indirectly, i.e. with one or at least two interlayers, or directly, i.e. without an interlayer. This is especially the case in the wording in which one layer superposed another layer. A wording in which a layer sequence comprises enumerated layers means that at least the layers specified are present in the sequence specified. This wording does not necessarily mean that these layers immediately follow one another. A wording in which two layers adjoin one another means that these two layers follow one another directly and hence without an interlayer. However, this wording does not make any stipulation as to whether the two layers are joined to one another or not. Instead, these two layers may be in contact with one another.

Polymer Layers

The term "polymer layer" hereinafter relates especially to the inner polymer layer and the outer polymer layer, more preferably to the inner polymer layer. A preferred polymer, especially for the inner polymer layer, is a polyolefin. The polymer layers may include further constituents. The polymer layers are preferably introduced into or applied to the sheetlike composite material in an extrusion process. The further constituents of the polymer layers are preferably constituents that do not adversely affect the behaviour of the polymer melt on application as a layer. The further constituents may, for example, be inorganic compounds such as metal salts or further plastics such as further thermoplastics.

However, it is also conceivable that the further constituents are fillers or pigments, for example carbon black or metal oxides. Suitable thermoplastics for the further constituents especially include those that are easily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, HDPE (high density polyethylene), MDPE (medium density polyethylene), LDPE (low density polyethylene), LLDPE (linear low density polyethylene), VLDPE (very low density polyethylene) and PE (polyethylene) and mixtures of at least two thereof are preferred. It is also possible to use mixtures of at least two thermoplastics. Suitable polymer layers have a melt flow rate (MFR) in a range from 1 to 25 g/10 min, preferably in a range from 2 to 20 g/10 min and especially preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and further preferably in a range from 0.900 g/cm$^3$ to 0.970 g/cm$^3$. The polymer layers preferably have at least one melting temperature in a range from 80 to 155° C., preferably in a range from 90 to 145° C. and especially preferably in a range from 95 to 135° C. Preferably, the sheetlike composite comprises, between the barrier layer and the carrier layer, a polymer layer, preferably a polyolefin layer, preferably a polyethylene layer. Further preferably, the composite precursor comprises, between the barrier layer and the carrier layer, a polymer layer, preferably a polyolefin layer, preferably a polyethylene layer. The above remarks relating to the polymer layers also apply to these polymer layers, also called adhesion promoter layers herein, of the composite and the composite precursor.

Inner Polymer Layer

The inner polymer layer is based on thermoplastic polymers, and the inner polymer layer may include a particulate inorganic solid. It is preferable, however, that the inner polymer layer comprises a thermoplastic polymer to an extent of at least 70% by weight, preferably at least 80% by weight and especially preferably at least 95% by weight, based in each case on the total weight of the inner polymer layer. It is further preferable that the inner polymer layer comprises at least 30% by weight, especially preferably at least 40% by weight and most preferably at least 50% by weight, based in each case on the total weight of the inner polymer layer, of a polyolefin prepared by means of a metallocene catalyst, preferably a polyethylene prepared by means of a metallocene catalyst (mPE). Further preferably, the inner polymer layer comprises an mLLDPE (linear low density polyethylene prepared by means of a metallocene catalyst).

Preferably, the polymer or polymer mixture of the inner polymer layer has a density (to ISO 1183-1:2004) in a range from 0.900 to 0.930 g/cm$^3$, especially preferably in a range from 0.900 to 0.920 g/cm$^3$ and most preferably in a range from 0.900 to 0.910 g/cm$^3$. The MFR (ISO 1133, 190° C./2.16 kg) is preferably in a range from 4 to 17 g/10 min, especially preferably in a range from 4.5 to 14 g/10 min and most preferably in a range from 6.5 to 10 g/10 min.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. As well as a number of plastics, preference is given to plant-based fibrous materials, especially pulps, preferably sized, bleached and/or unbleached pulps, paper and cardboard being especially preferred. The grammage of the carrier layer is preferably in a range from 120 to 450 g/m$^2$, especially preferably in a range from 130 to 400 g/m$^2$ and most preferably in a range from 150 to 380 g/m$^2$. A more preferred cardboard generally has a single-layer or multilayer structure and may have been coated on one or both sides with one or else more than one cover layer. In addition, a more preferred cardboard has a residual moisture content of less than 20% by weight, preferably of 2% to 15% by weight and especially preferably of 4% to 10% by weight, based on the total weight of the cardboard. A more particularly preferred cardboard has a multilayer structure. Further preferably, the cardboard has, on the surface facing the environment, at least one lamina, but more preferably at least two laminas, of a cover layer known to the person skilled in the art as a "paper coating". In addition, a more preferred cardboard has a Scott bond value in a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

Barrier Layer

The barrier layer used may be any material which is suitable for a person skilled in the art for this purpose and which has sufficient barrier action, especially with respect to oxygen. The barrier layer is preferably selected from a. a plastic barrier layer;
    b. a metal layer;
    c. a metal oxide layer; or
    d. a combination of at least two from a. to c.

If the barrier layer, according to alternative a., is a plastic barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastics, especially thermoplastics, here include N- or O-bearing plastics, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the plastic barrier layer has a grammage in a range from 2 to 120 g/m$^2$, preferably in a range from 3 to 60 g/m$^2$, especially preferably in a range from 4 to 40 g/m$^2$ and further preferably from 6 to 30 g/m$^2$. Further preferably, the plastic barrier layer is obtainable from melts, for example by extrusion, especially laminar extrusion. Further preferably, the plastic barrier layer may also be introduced into the sheetlike composite via lamination. It is preferable in this context that a film is incorporated into the sheetlike composite. In another embodiment, it is also possible to select plastic barrier layers obtainable by deposition from a solution or dispersion of plastics.

Suitable polymers preferably include those having a weight-average molecular weight, determined by gel permeation chromatography (GPC) by means of light scattering, in a range from $3 \times 10^3$ to $1 \cdot 10^7$ g/mol, preferably in a range from $5 \cdot 10^3$ to $1 \cdot 10^6$ g/mol and especially preferably in a range from 6·10³ to 1·10⁵ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm³, preferably in a range from 1.05 to 1.30 g/cm³ and especially preferably in a range from 1.08 to 1.25 g/cm³. It is further preferable that the PA has a viscosity number in a range from 130 to 185 ml/g and preferably in a range from 140 to 180 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all of the following properties:
- an ethylene content in a range from 20 to 60 mol %, preferably from 25 to 45 mol %;
- a density in a range from 1.0 to 1.4 g/cm³, preferably from 1.1 to 1.3 g/cm³;
- a melting point in a range from more than 155 to 235° C., preferably from 165 to 225° C.;
- an MFR value (210° C./2.16 kg when $T_{S(EVOH)}$<230° C.; 230° C./2.16 kg when 210° C.<$T_{S(EVOH)}$<230° C.) in a range from 1 to 25 g/10 min, preferably from 2 to 20 g/10 min;
- an oxygen permeation rate in a range from 0.05 to 3.2 cm³·20 μm/m²·day·atm, preferably in a range from 0.1 to 1 cm³·20 μm/m²·day·atm.

Preferably at least one polymer layer, further preferably the inner polymer layer, or preferably all polymer layers, have a melting temperature below the melting temperature of the barrier layer. This is especially true when the barrier layer is formed from polymer. In this case, the melting temperatures of the at least one polymer layer, especially the inner polymer layer, and the melting temperature of the barrier layer differ preferably by at least 1 K, especially preferably by at least 10 K, even more preferably by at least 50 K, further preferably at least 100 K. The temperature difference should preferably be chosen only such that it is sufficiently high that there is no melting of the barrier layer, especially no melting of the polymer barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 μm, preferably in a range from 3.5 to 12 μm and especially preferably in a range from 4 to 10 μm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a preferred configuration, the metal layer consists of an aluminium foil. Suitable aluminium foils have a ductility of more than 1%, preferably of more than 1.3% and especially preferably of more than 1.5%, and a tensile strength of more than 30 N/mm², preferably more than 40 N/mm² and especially preferably more than 50 N/mm². Suitable aluminium foils in the pipette test show a droplet size of more than 3 mm, preferably more than 4 mm and especially preferably of more than 5 mm. Suitable alloys for creation of aluminium layers or foils are commercially available under the EN AW 1200, EN AW 8079 or EN AW 8111 names from Hydro Aluminium Deutschland GmbH or Amcor Flexibles Singen GmbH. In the case of a metal foil as barrier layer, it is possible to provide an adhesion promoter layer between the metal foil and a closest polymer layer on one or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred method for this purpose is physical gas phase deposition.

In a further preferred embodiment, the metal layer of the metal oxide layer may take the form of a layer composite composed of one or more polymer layers with a metal layer. Such a layer is obtainable, for example, by vapour deposition of metal on a polymer layer, for example an oriented polypropylene film. A preferred method for this purpose is physical gas phase deposition.

Outer Surface

The outer surface of the sheetlike composite is a surface of a lamina of the sheetlike composite which is intended to be in contact with the environment of the container in a container which is to be produced from the sheetlike composite. This does not contradict, outer surfaces of various regions of the composite being folded against one another or joined to one another, for example being sealed to one another, in individual regions of the container.

Inner Surface

The inner surface of the sheetlike composite is a surface of a lamina of the sheetlike composite which is intended to be in contact with the contents of the container, preferably a foodstuff, in a container to be produced from the sheetlike composite.

Colourant

According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition"

(Willy Herbst, Klaus Hunger Copyright © 2004 WILEY-VCH Verlag GmbH & Co. KGaA, Weinheim ISBN: 3-527-30576-9).

Adhesion/Adhesion Promoter Layer

An adhesion promoter layer may be present between layers which do not directly adjoin one another. More particularly, an adhesion promoter layer may be present between the barrier layer and the inner polymer layer, and between the barrier layer and the carrier layer.

Useful adhesion promoters in an adhesion promoter layer include all plastics which are suitable for producing a firm bond through functionalization by means of suitable functional groups, through the forming of ionic bonds or covalent bonds with a surface of a respective adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrerl®0609HSA trade names by DuPont or Escor®6000ExCo by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration of the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as carrier layer.

Polyolefin

A preferred polyolefin is a polyethylene or a polypropylene or both. A preferred polyethylene is one selected from the group consisting of an LDPE, an LLDPE, and an HDPE, or a combination of at least two thereof. A further preferred polyolefin is an mPolyolefin. Suitable polyethylenes have a melt flow rate (MFR) in a range from 1 to 25 g/10 min, preferably in a range from 2 to 20 g/10 min and especially preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

mPolymer

An mPolymer is a polymer which has been prepared by means of a metallocene catalyst. Metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

In the extrusion, the polymers are typically heated to temperatures of 210 to 330° C., measured in the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is pressed. The opening may have any shape that allows extrusion of the polymer melt to the composite precursor. For example, the opening may be angular, oval or round. The opening is preferably in the form of a slot of a funnel. In a preferred configuration of the method, application is effected through a slot. The slot preferably has a length in a range from 0.1 to 100 m, preferably in a range from 0.5 to 50 m, especially preferably in a range from 1 to 10 m. In addition, the slot preferably has a width in a range from 0.1 to 20 mm, preferably in a range from 0.3 to 10 mm, especially preferably in a range from 0.5 to 5 mm. During the application of the polymer melt, it is preferable that the slot and the composite precursor move relative to one another. Preference is given to such a process wherein the composite precursor moves relative to the slot.

In a preferred extrusion coating method, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched in the preferably monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with a velocity of emergence $V_{out}$;

b2. application of the melt film to the composite precursor moving relative to the at least one extruder die slot with a velocity of movement $V_{for}$;

where $V_{out}<V_{for}$. It is especially preferable that $V_{for}$ is greater than $V_{out}$ by a factor in the range from 5 to 200, especially preferably in a range from 7 to 150, further preferably in a range from 10 to 50 and most preferably in a range from 15 to 35. It is preferable here that $V_{for}$ is at least 100 m/min, especially preferably at least 200 m/min and most preferably at least 350 m/min, but typically not more than 1300 m/min. Once the melt layer has been applied to the composite precursor by means of the above-described stretching process, the melt layer is left to cool down for the purpose of heat-setting, this cooling preferably being effected by quenching via contact with a surface which is kept at a temperature in a range from 5 to 50° C., especially preferably in a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the area. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Foodstuff

The present sheetlike composite and the container precursor are preferably designed for production of a foodstuff container. In addition, the closed container according to the invention is preferably a foodstuff container. Foodstuffs include all kinds of food and drink known to those skilled in the art for human consumption and also animal feeds. Preferred foodstuffs are liquid above 5° C., for example milk products, soups, sauces, non-carbonated drinks Container The closed container according to the invention may have a multitude of different forms, but preference is given to an essentially cuboid structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used particularly in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from plastic and be mounted on the outside of the container. It is also conceivable that this device has been integrated into the container by direct injection moulding. In a preferred configuration, the container according to the invention has at least one edge, preferably from 4 to 22 or else more edges, especially preferably from 7 to 12 edges. Edges in the context of the present invention are understood to mean regions which arise in the folding of a surface. Illustrative edges include elongate contact regions between two wall surfaces of the container in each case, also referred to as longitudinal edges herein. In the container, the container walls are preferably the surfaces of the container framed by the edges. Preferably, the interior of a container according to the invention comprises a foodstuff.

Production of a Fold

A fold is produced along a crease if an internal angle formed by the fold regions of the sheetlike composite that are adjacent along the crease differs by at least 10° from 180° for the first time as a result of folding. In the course of production of the fold by folding for the first time by at least 10° along the crease as described above, more particularly, the carrier layer is weakened along the fold.

Test Methods

The test methods which follow were utilized in the context of the invention. Unless stated otherwise, the measurements were conducted at an ambient temperature of 23° C., an ambient air pressure of 100 kPa (0.986 atm) and a relative air humidity of 50%.

MFR

MFR is measured in accordance with standard ISO 1133 (unless stated otherwise at 190° C. and 2.16 kg).

Density

Density is measured in accordance with standard ISO 1183-1.

Melting Temperature

Melting temperature is determined using the DSC method ISO 11357-1, -5. The instrument is calibrated according to the manufacturer's instructions using the following measurements:

temperature indium—onset temperature,
heat of fusion indium,
temperature zinc—onset temperature.

Oxygen Permeation Rate

Oxygen permeation rate is determined in accordance with standard ISO 14663-2 Annex C at 20° C. and 65% relative air humidity.

Moisture Content of Cardboard

Moisture content of cardboard is measured in accordance with standard ISO 287:2009.

Adhesion

The adhesion of two adjacent layers is determined by fixing them in a 90° peel test instrument, for example the Instron "German rotating wheel fixture", on a rotatable roller which rotates at 40 mm/min during the measurement. The samples were previously cut into strips of width 15 mm. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Shaping Coefficient

The shaping coefficient is defined as follows:

Shaping coefficient=shaping force/(zero sample force·grammage).

This can be represented as:

$$K = \frac{F_{shaping}}{F_{zero\ sample} \cdot GR} = \left[\frac{N}{mN \cdot \frac{g}{m^2}}\right] \triangleq 1000000 \left[\frac{m^2}{kg}\right]$$

where K is the shaping coefficient, $F_{shaping}$ is the shaping force, $F_{zero\ sample}$ is the zero sample force and GR is the grammage. Thus, the unit of the shaping coefficient is m²/kg. The individual parameters of the shaping coefficient are determined as specified below.

Zero Sample Force

Figure 8:
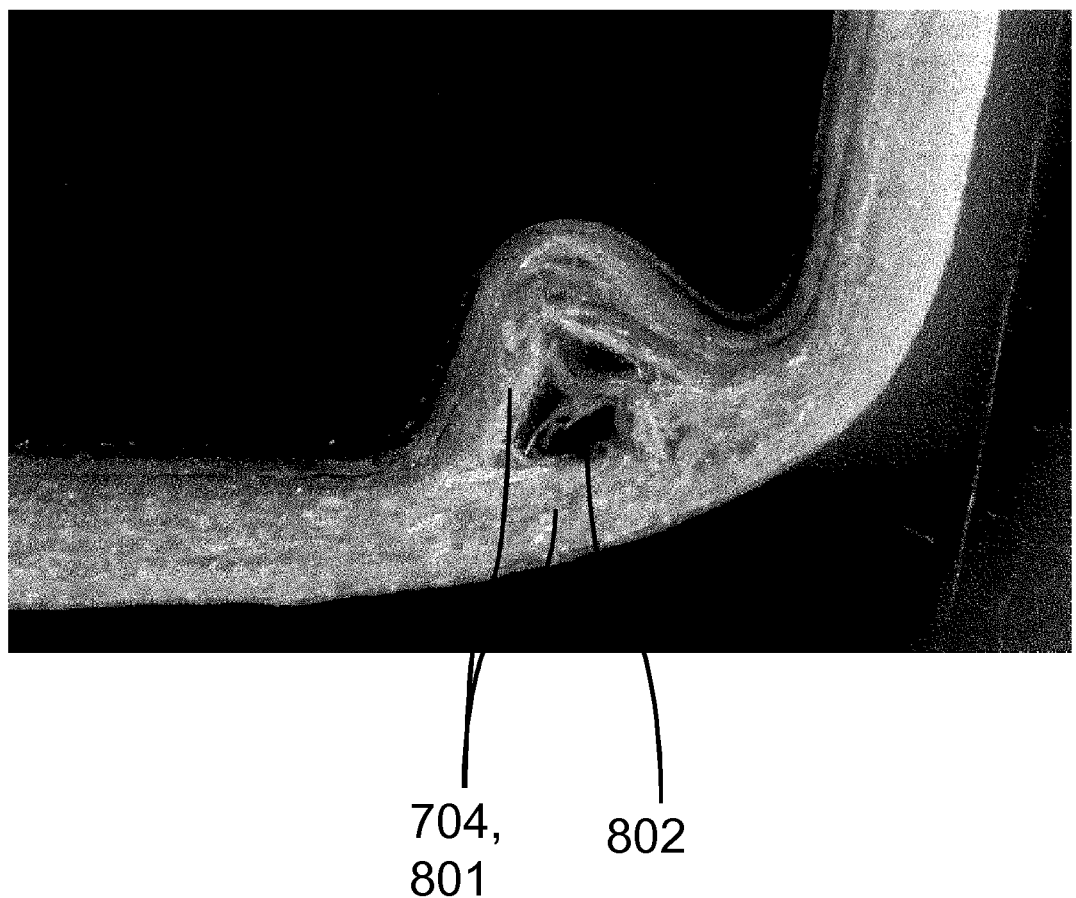

To measure the zero sample force, three specimens are taken from the uncreased container precursor according to the German version of DIN EN ISO 186:2002, the sample size being 60 mm×25 mm. These specimens are then analysed by means of an SRT-Win 1.5 crease-bend tester from Karl Marbach GmbH & Co. KG, Heilbronn, Germany, according to the operating instructions dated March 2010. This is done by clamping the specimens in a holding clamp developed in-house and placing them onto the turntable. The configuration of the clamp is shown in FIGS. 8 a) and b), 9 a) and b) and 10 a) and b). The evaluation is effected according to DIN 55437-3:2008-05 and DIN 53121:2014-08, the maximum force value over the bending angle range being determined here at bending of up to 150°.

Shaping Force

To measure the shaping force, the container precursor is clamped in unchanged form as obtained by the method according to the invention in the flat-folded state between two compression plates of a strength testing machine (TIRA test 28025 universal strength testing machine) from TIRA GmbH, Schalkau, Germany and, as in the "Compression test" method according to DIN EN ISO 12048:2000, in the case of the compression test, a load is applied until a fixed displacement (to be selected according to the container precursor format, typically 30 mm) has taken place. The curve profile is recorded and evaluated with the TIRA test software.

The universal strength testing machine is a motor-driven compression plate system capable of applying a load which results from uniform movement of one of the plates at a relative speed of 10 mm/min±3 mm/min.

Grammage

The grammage is determined by taking a laminate sample of defined size from the container precursor and weighing the sample.

The invention is described in more detail hereinafter by examples and drawings, although the examples and drawings do not imply any restriction of the invention. Moreover, the drawings, unless stated otherwise, are not to scale.

For the examples (inventive) and comparative examples (non-inventive), laminates were produced with the following layer sequence by a layer extrusion method with a standard extrusion coating system.

TABLE 1

Layer structure of the laminate used for the examples and comparative examples

| Layer designation | Material | Grammage [g/m$^2$] |
|---|---|---|
| Decorative layer | MAS ink series, SunChemical, Parssippany, USA | / |
| Outer polymer layer | LDPE 23L430 from Ineos GmbH, Cologne | 15 |
| Carrier layer | Cardboard: Stora Enso Natura T Duplex double coated, Scott bond 200 J/m$^2$ | 191 |
| Lamination layer | LDPE 23L430 from Ineos GmbH, Cologne | 20 |
| Barrier layer | Aluminium, EN AW 8079 from Hydro Aluminium Deutschland GmbH | here thickness 6 μm |
| Inner polymer layer | LDPE 19N430 from Ineos GmbH, Cologne | 40 |

The laminate obtained by the layer extrusion process is used to manufacture container precursors in the form of sleeves for the examples and comparative examples. In each case, longitudinal creases 1 to 4 are introduced, as is the corresponding first to fourth longitudinal fold. Moreover, a longitudinal seam is produced by means of heat sealing.

The internal and external angles of the longitudinal folds are produced in the laboratory with a folding flap (Lexikon Verpackungstechnik [Lexicon of Packaging Technology], ISBN3954681668, 9783954681662, page 155). The heat sealing is effected by means of an HSG250 heat-sealing unit from Kopp Verpackungstechnik, Esslingen, Germany. The initial pressure is set to 4.5 bar and the sealing temperature to 135° C.

In addition, a multitude of container precursors are introduced into an outer package for transport. The outer package for transport has the following dimensions: length 600 mm; width 110 mm; height 152 mm. Table 2 reports, for the various methods, the minimum first to fourth internal angles achieved, i.e. how far the first to fourth longitudinal folds were folded. In addition, Table 2 states the maximum of the fourth internal angle. If the internal angle is increased to more than 180° by folding, this is referred to as overstretching. In addition, Table 2 states whether and, if so, when the container precursor is folded over, i.e. whether it is converted from a relatively flat-folded state to another relatively flat-folded state. In this context, Table 2 gives, for each example and comparative example, the minima of the first to fourth internal angles over the entire folding process. Minimum internal angles identified by an * were produced before the longitudinal seam formation. In Comparative Example 3, the 1st and 3rd internal angles are only folded as a result of the folding over in the filling machine. Thus, the 1st and 3rd internal angles before the filling machine in Comparative Example 3 are a minimum of 180°. The 2nd and 4th internal angles, by contrast, are already folded to a minimum of 15° prior to the outer packing.

TABLE 2

Characterization of container precursor manufacturing methods according to examples and comparative examples

| Example | Minima of the internal angles | | | | Maximum of the 4th internal angle | Folding over |
|---|---|---|---|---|---|---|
| | 1st | 2nd | 3rd | 4th | | |
| Comparative Example 1 | 30° | 30° | 30° | 30° | 180° | no |
| Comparative Example 2 | 30° | 15° | 30° | 15° | 180° | no |
| Comparative Example 3 | 15° | 15° | 15° | 15° | 180° | Once in filling machine |
| Comparative Example 4 | 15° | 15° | 15° | 15° | 180° | Once after longitudinal seam formation and before outer packing |
| Example 1 | 15°* | 15°* | 15°* | 15°* | 180° | no |
| Example 2 | 10°* | 10°* | 10°* | 10°* | 180° | no |

TABLE 2-continued

Characterization of container precursor manufacturing methods according to examples and comparative examples

| Example | Minima of the internal angles | | | | Maximum of the 4th internal angle | Folding over |
|---|---|---|---|---|---|---|
| | 1st | 2nd | 3rd | 4th | | |
| Example 3 | 5°* | 5°* | 5°* | 5°* | 180° | no |
| Example 4 | 5°* | 5°* | 5°* | 5°* | 192° | no |
| Example 5 | 5°* | 5°* | 5°* | 5°* | 204° | no |

(*= before longitudinal seam formation)

TABLE 3

Further characterization of the container precursor manufacturing methods according to the examples and comparative examples

| Example | Min. manufacturing time for a container precursor [sec] | Length of the production line [m] | Energy consumption of the production line | Exposure of personnel to noise nuisance |
|---|---|---|---|---|
| Comparative Example 1 | 2.7 | 27.3 | + | + |
| Comparative Example 2 | 2.7 | 27.3 | + | + |
| Comparative Example 3 | 2.7 | 27.3 | + | + |
| Comparative Example 4 | 3.5 | 30.3 | − | − |
| Example 1 | 2.7 | 27.3 | + | + |
| Example 2 | 2.7 | 27.3 | + | + |
| Example 3 | 2.7 | 27.3 | + | + |
| Example 4 | 2.7 | 27.3 | + | + |
| Example 5 | 2.7 | 27.3 | + | + |

The energy consumption and the resultant noise nuisance in the container precursor manufacturing methods according to the examples and comparative examples are characterized in Table 3 according to the following scale:
+ low energy consumption/low noise nuisance
− high energy consumption/high noise nuisance

TABLE 4

Characterization of container precursors according to examples and comparative examples in the dispensing process

| Example | Shaping coefficient of the container precursor [m²/kg] | Shaping defects in filling machine [per 1000] | Damage to the decorative layer | Number of sleeves in one outer package |
|---|---|---|---|---|
| Comparative Example 1 | 34 | 87 | − | 178 |
| Comparative Example 2 | 33 | 45 | 0 | 195 |
| Comparative Example 3 | 21 | 2 | − | 234 |
| Comparative Example 4 | 12.3 | 0 | − | 280 |
| Example 1 | 21 | 2 | + | 255 |
| Example 2 | 15 | 1 | + | 278 |
| Example 3 | 11.7 | 0 | + | 293 |
| Example 4 | 10 | 0 | + | 303 |
| Example 5 | 8 | 0 | + | 320 |

The damage to the decorative layer is characterized in Table 4 according to the following scale:
+ no damage to the decorative layer (not apparent either to the naked eye or with a magnifying glass with 6-fold magnification)
0 slight damage to the decorative side (apparent with a magnifying glass with 6-fold magnification)
− damage to the decorative side visible to the eye The results in Table 4 have been established using a CFA 712 standard filling machine from SIG Combibloc, Linnich, Germany. For this purpose, for each example and comparative example, 1000 container precursors were processed in the filling machine. The shaping coefficients for each example and comparative example were each measured by the method described above after the attainment of the minima of the 1st to 4th internal angles. This means that the shaping coefficients for Comparative Examples 1 and 2 and Examples 1 to 5 were measured before the outer packing. In Comparative Example 3, accordingly, the container precursor, after being folded over in the filling machine and before the filling of the machine, was removed and the shaping coefficient was measured. In addition, accordingly, in Comparative Example 4, the shaping coefficient measurement was conducted after the folding and before the outer packing. This course of action ensures that what is determined is always the shaping coefficient which is of relevance to the filling in respect of the shaping in the filling machine.

Figure 3:
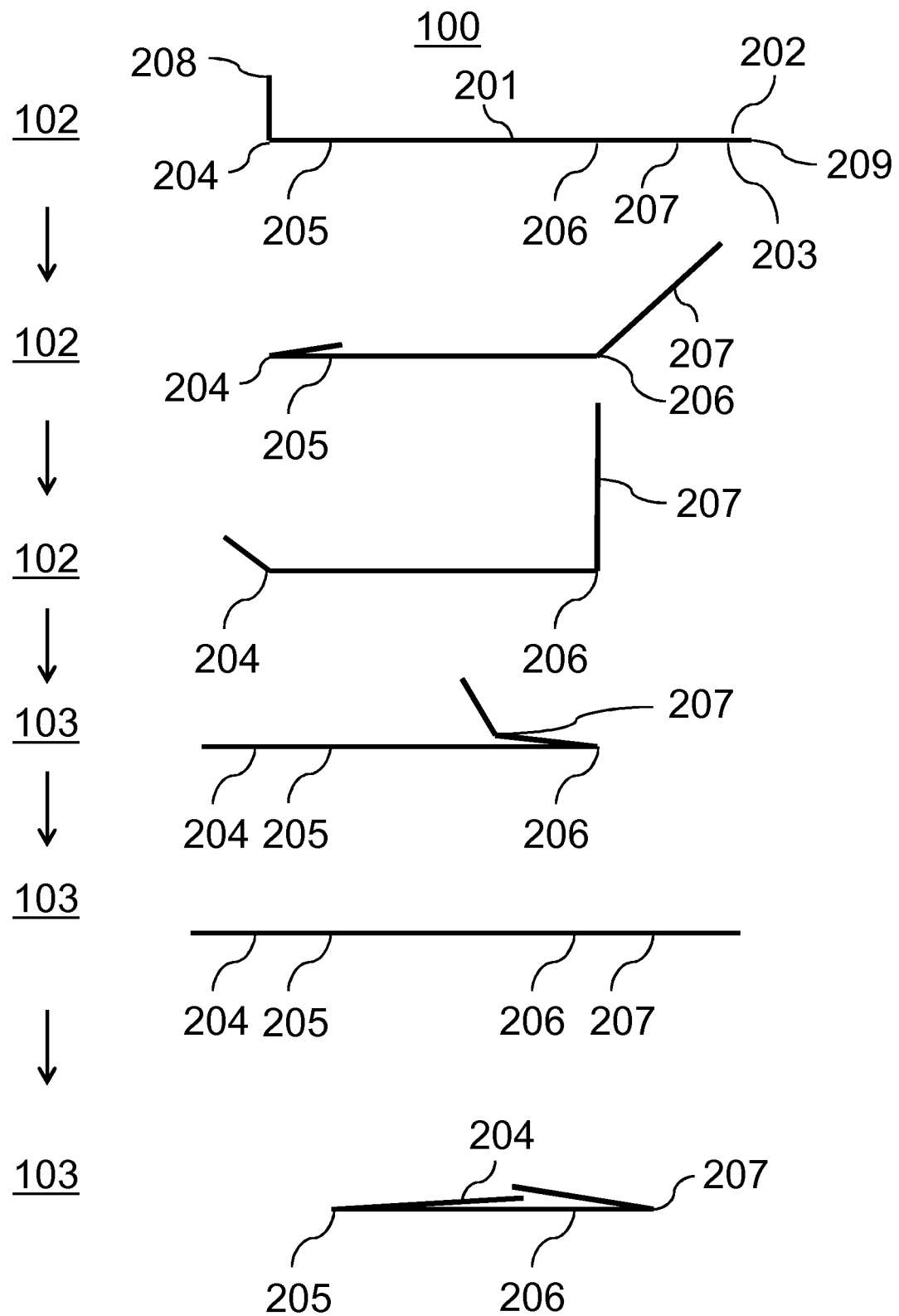
Figure 4:
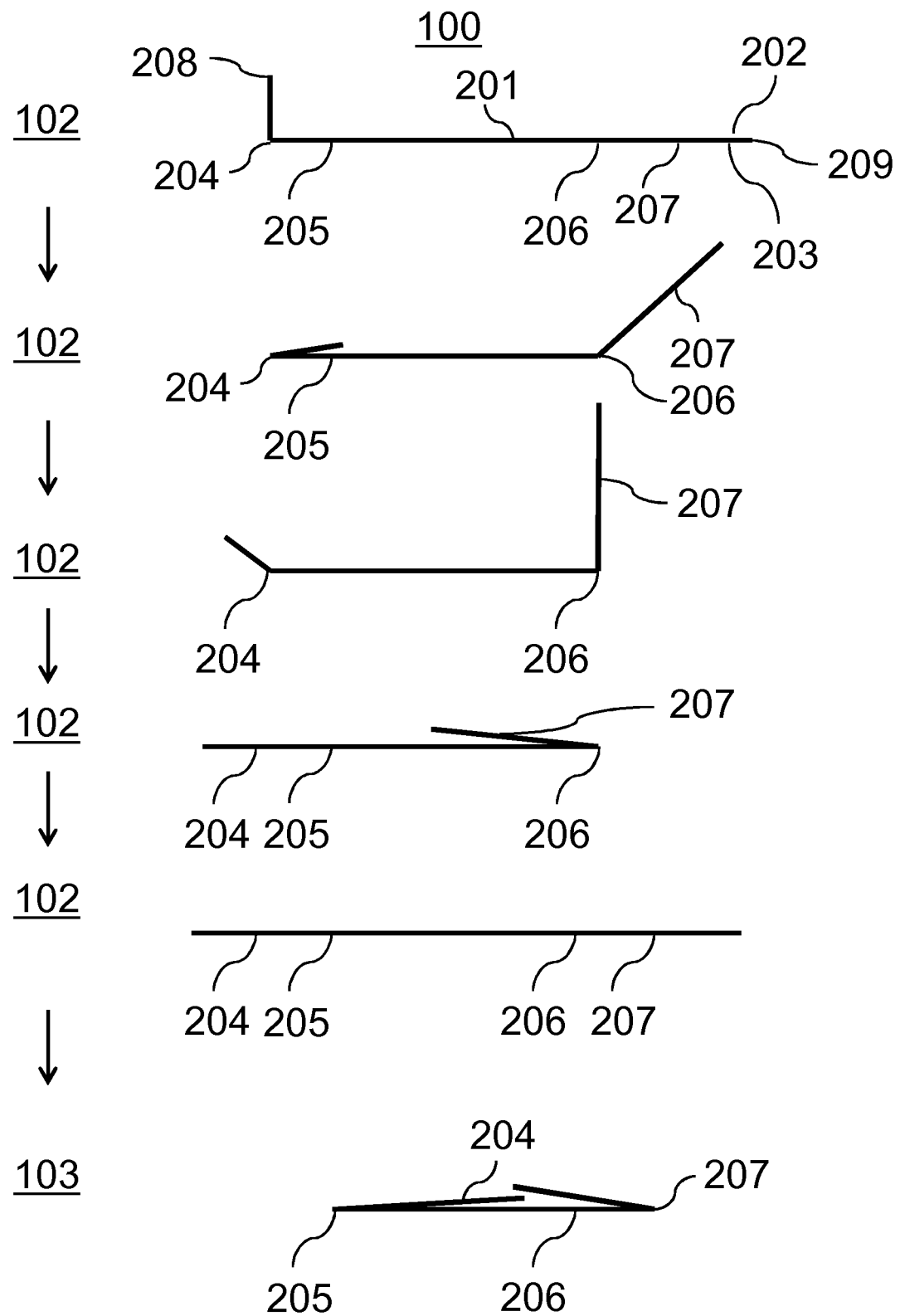
Figure 5:
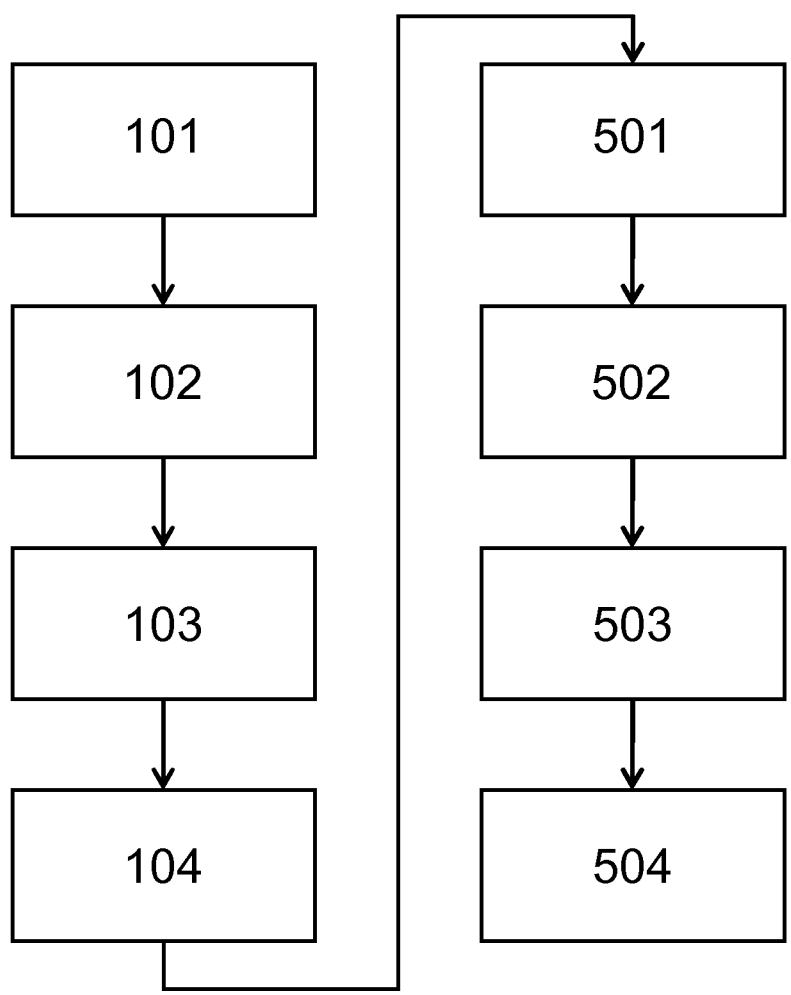
Figure 6:
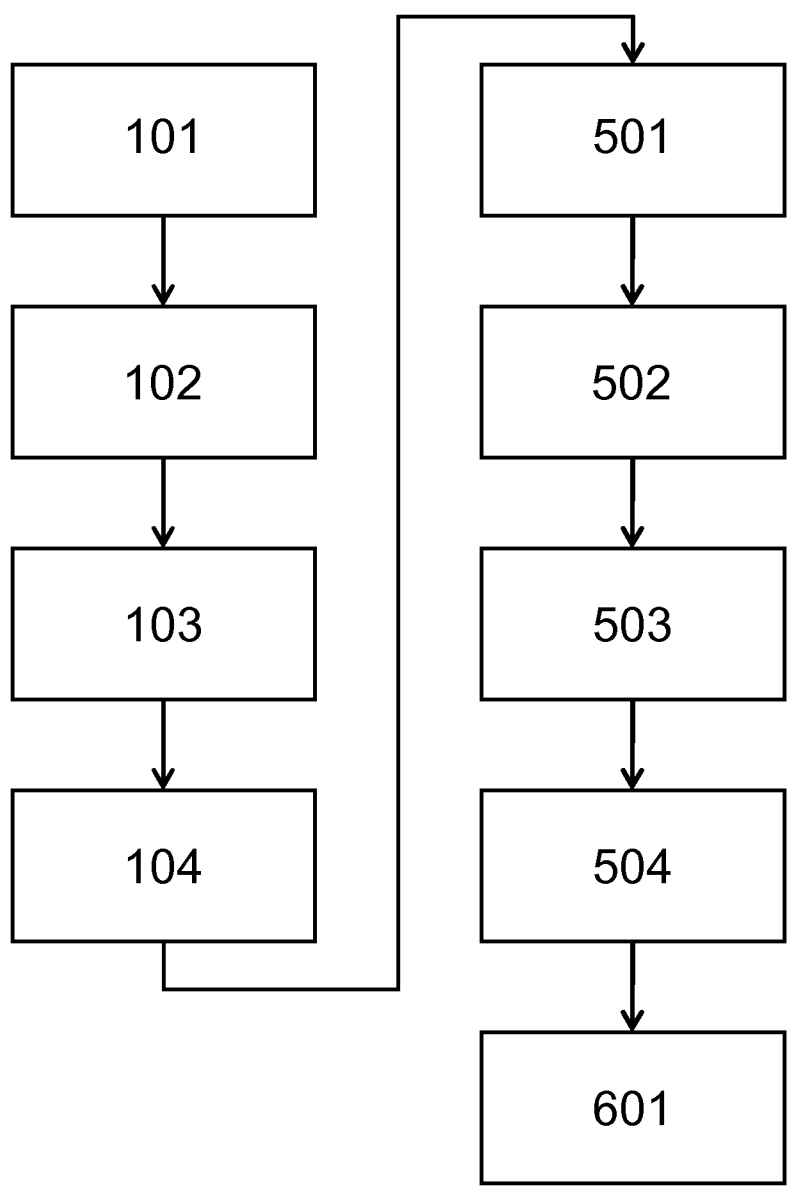
Figure 7:
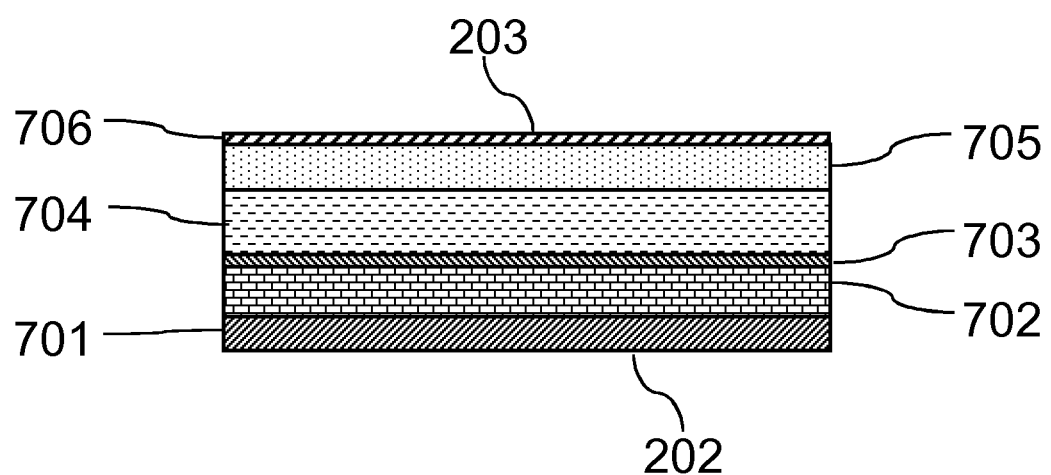
Figure 9:
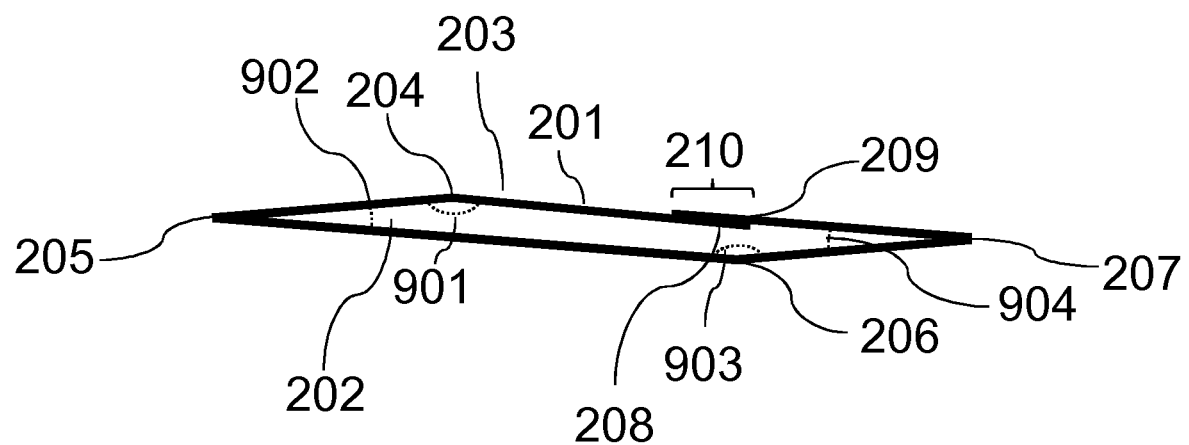
Figure 10:
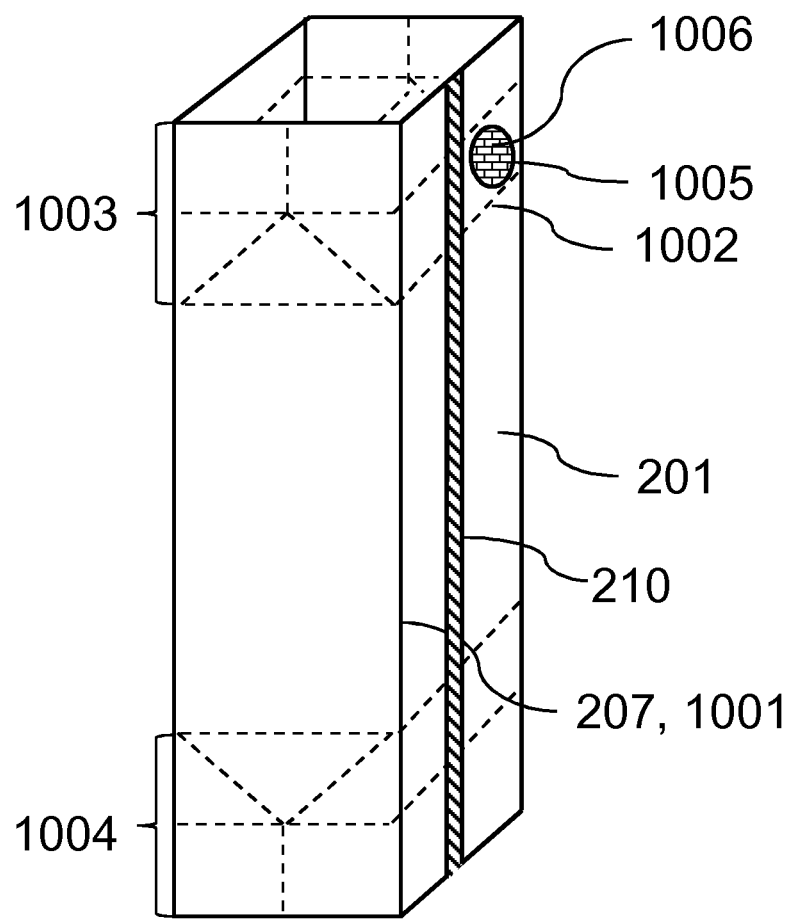
Figure 11:
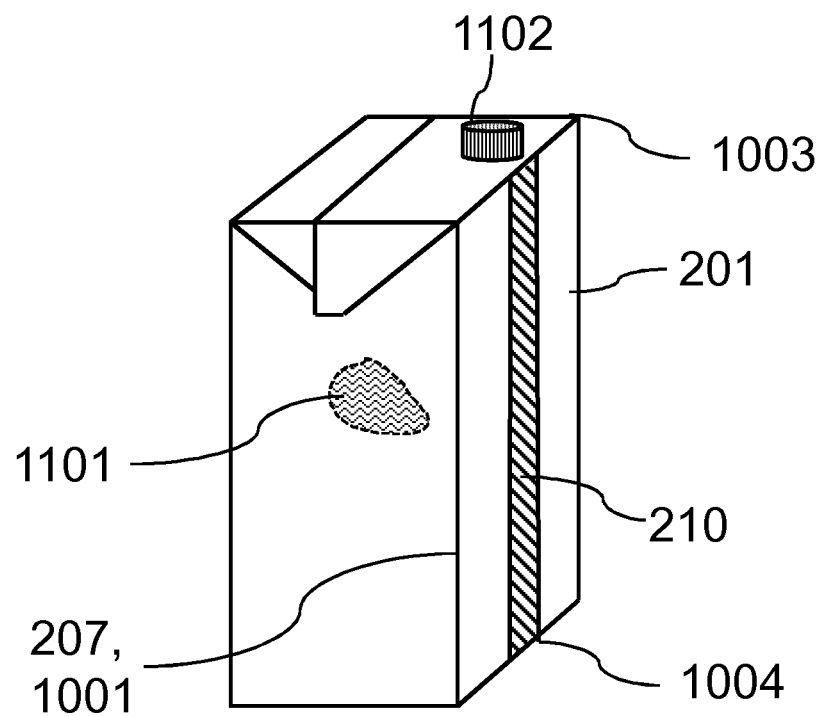
Figure 12:
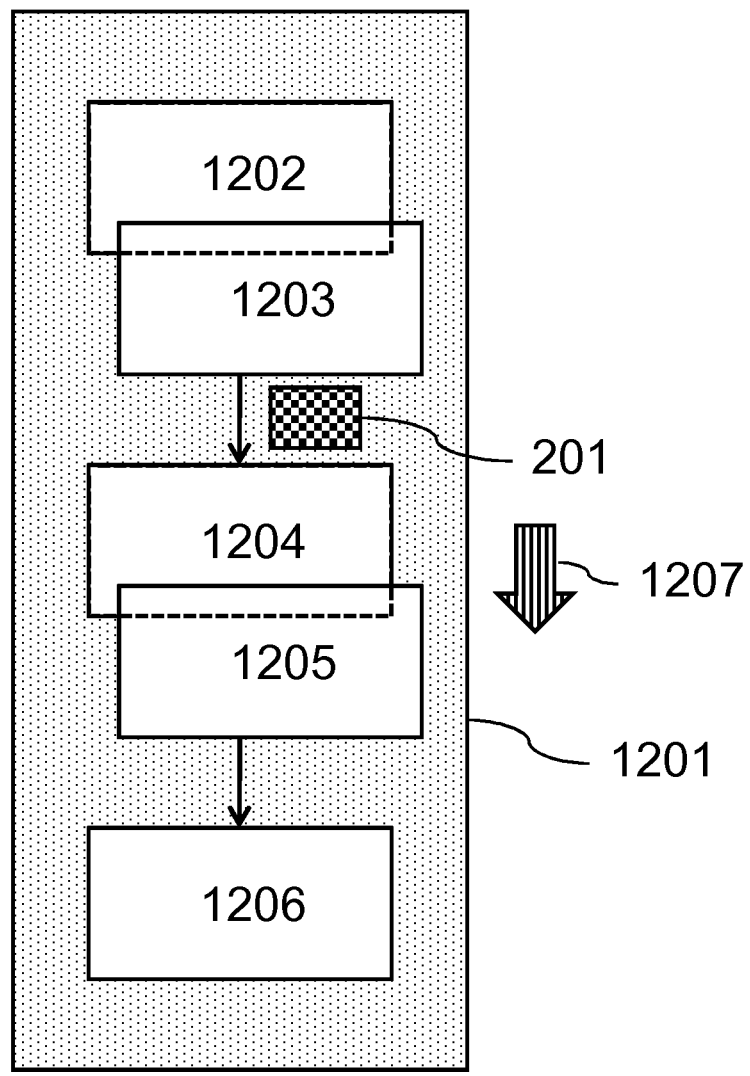
Figure 13:
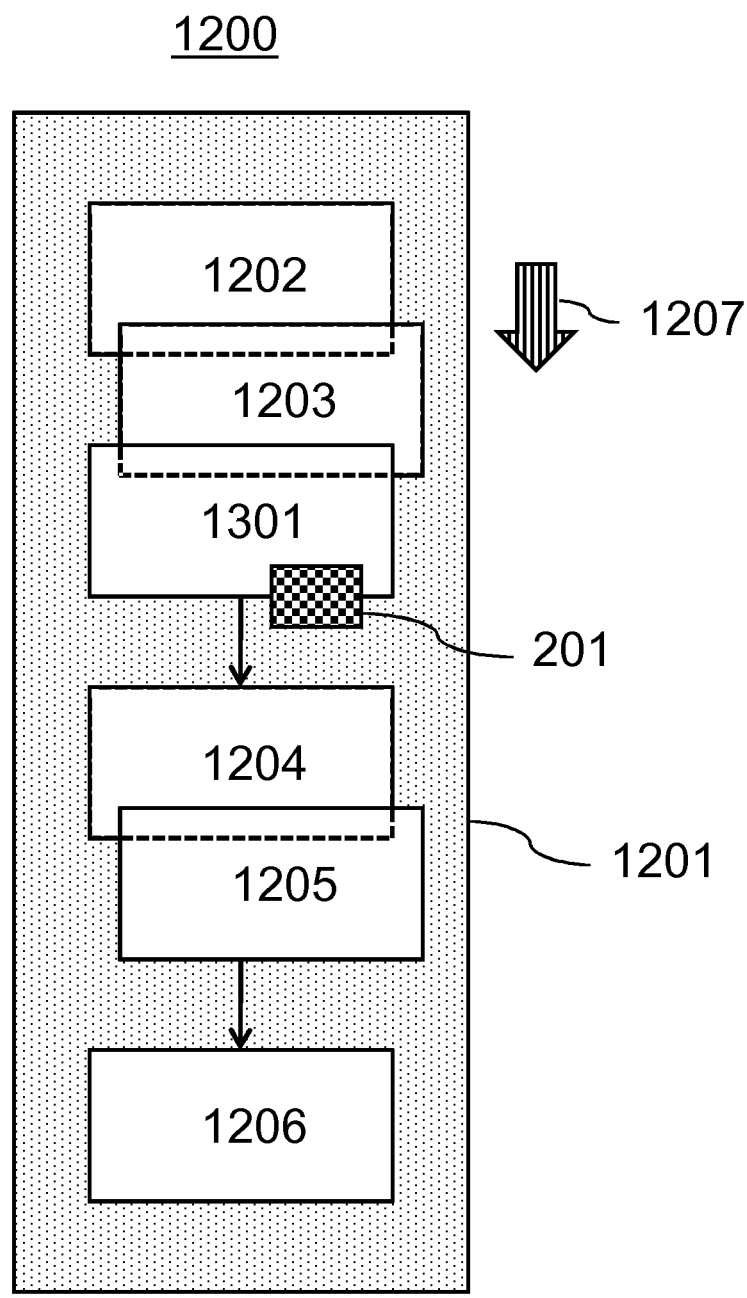
Figure 14:
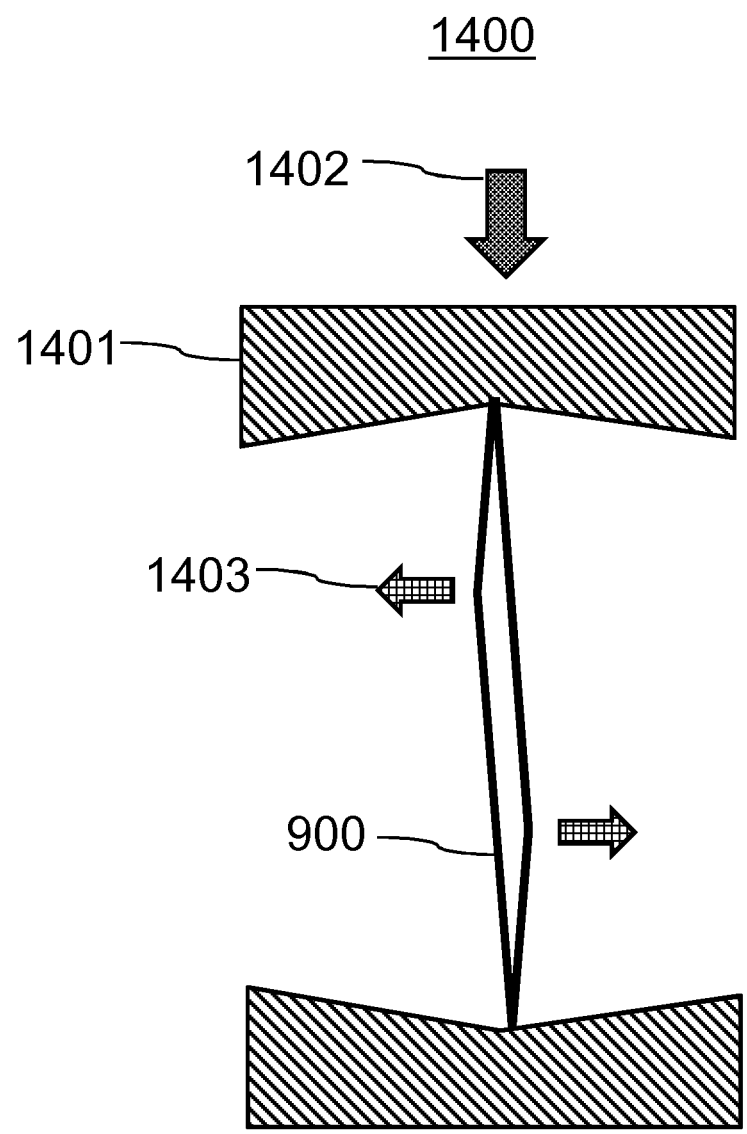

Unless stated otherwise in each case in the description or the respective figure, the figures are schematic and not true to scale, and show the following:

FIG. 1 a flow diagram of a process according to the invention;

FIG. 2 schematic snapshots of the sheetlike composite in method steps a) to d) of the method according to the invention according to FIG. 1;

FIG. 3 schematic snapshots of a sheetlike composite in method steps b) and c) of a further method according to the invention;

FIG. 4 schematic snapshots of a sheetlike composite in method steps b) and c) of a further method according to the invention;

FIG. 5 a flow diagram of a further method according to the invention;

FIG. 6 a flow diagram of a further method according to the invention;

FIG. 7 a detail of the sheetlike composite of the method according to FIG. 1 in cross section;

FIG. 8 a microscope image of a longitudinal crease of a sheetlike composite of a container precursor according to the invention in cross section;

FIG. 9 a container precursor according to the invention in top view (upright);

FIG. 10 the container precursor according to FIG. 9 in side view (upright) after shaping;

FIG. 11 a closed container according to the invention;

FIG. 12 an apparatus according to the invention;

FIG. 13 a further apparatus according to the invention;

FIG. 14 a test setup for measuring the shaping force;

FIG. 15a) a holding clamp;

FIG. 15b) the holding clamp according to FIG. 15a) in a further view;

FIG. 16a) the holding clamp according to FIG. 15a) in a further view;

FIG. 16b) the holding clamp according to FIG. 15a) with a turntable;

FIG. 17a) the holding clamp according to FIG. 15a) in a further view;

FIG. 17b) the holding clamp according to FIG. 15a) in a further view; and

Figure 18:
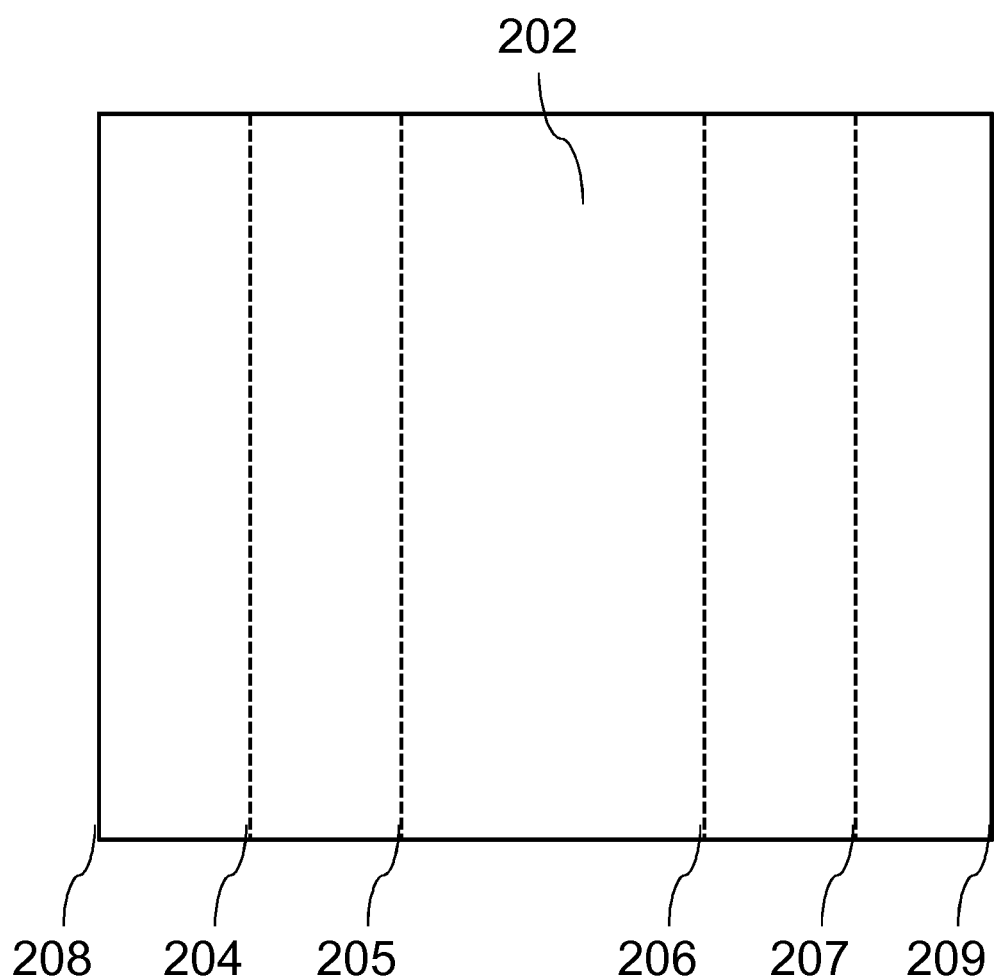

FIG. 18 the sheetlike composite from method step a) of the method according to FIG. 1.

FIG. 1 shows a flow diagram of a method 100 according to the invention. In a method step a) 101 of the method 100, a sheetlike composite 201 is provided. The latter comprises, as mutually superposed layers, from an inner face 202 of the sheetlike composite 201 to an outer face 203 of the sheetlike composite 201, a layer structure shown in FIG. 7. In addition, the sheetlike composite 201, as shown in FIG. 18, comprises a first longitudinal edge 208 and, opposite that, a further longitudinal edge 209, and also, in the direction from the first longitudinal edge 208 to the further longitudinal edge 209: a first longitudinal crease 204, a second longitudinal crease 205, a third longitudinal crease 206 and a fourth longitudinal crease 207. In a method step b) 102, by folding along the first longitudinal crease 204, a first longitudinal fold is produced and, by folding along the third longitudinal crease 206, a third longitudinal fold is produced. In this context, the first longitudinal fold is characterized by a first internal angle 901 and the third longitudinal fold by a third internal angle 903. In a method step c) 103, by folding along the fourth longitudinal crease 207, a fourth longitudinal fold is produced and, by folding along the second longitudinal crease 205, a second longitudinal fold is produced. In this context, the fourth longitudinal fold is characterized by a fourth internal angle 904 and the second longitudinal fold by a second internal angle 902. In the production of the first to fourth longitudinal folds 204-207, the first to fourth internal angles 901-904 are each altered by at least 10°. In this context, the first to fourth internal angles 901-904 are each on the inner face 202 of the sheetlike composite 201. In a method step d) 104, the first longitudinal edge 208 and the further longitudinal edge 209 are pressed against one another and sealed to one another. Thus, a longitudinal seam 210 is produced, which results in formation of a sleeve-like container precursor 900 for a single container 1100 from the folded sheetlike composite 201.

FIG. 2 shows schematic snapshots of the sheetlike composite 201 in method steps a) 101 to d) 104 of the method according to the invention 100 according to FIG. 1. As shown, the sheetlike composite 201 provided in method step a) 101 is unfolded, but creased. The sheetlike composite 201 comprises, in the direction from the first longitudinal edge 208 to the further longitudinal edge 209: the first longitudinal crease 204, the second longitudinal crease 205, the third longitudinal g crease 206 and the fourth longitudinal crease 207. The sheetlike composite 201 provided is a blank for manufacture of a single closed foodstuff container 1100. In addition, FIG. 2 shows a snapshot in method step b) 102. Here, the first longitudinal fold along the first longitudinal crease 204 and the third longitudinal fold along the third longitudinal crease 206 have already been produced. The first internal angle 901 is reduced to 3° and the third internal angle 903 to 5°. Subsequently, the first internal angle 901 and the third internal angle 903 are each increased to 180° (not shown). A snapshot of method step c) 103 shows the already produced second longitudinal fold along the second longitudinal crease 205 and the fourth longitudinal fold along the fourth longitudinal crease 207. The second internal angle 902 has been reduced to 3° and the fourth internal angle 904 to 5°. In a snapshot of method step d) 104, the first longitudinal edge 208 and the further longitudinal edge 209 have been contacted with one another and joined by sealing. Thus, the longitudinal seam 210 has been produced.

FIG. 3 shows schematic snapshots of a sheetlike composite 201 in method steps b) 102 and c) 103 of a further method according to the invention 100. In addition, the method 100 according to FIG. 3 comprises method steps a) 101 and d) 104, which are configured as method steps a) 101 and d) 104 of the method 100 of FIGS. 1 and 2. In method step b) 102 according to FIG. 3, the first internal angle 901 is first reduced to 90° and hence the first longitudinal fold along the first longitudinal crease 204 is produced. In addition, in method step b) 102, the first internal angle 901 is reduced further to 1° and, at the same time, the third internal angle 903 is reduced to 135° and hence the third longitudinal fold along the third longitudinal crease 206 is produced. In addition, in method step b) 102, the first internal angle 901 is increased to 135° and, at the same time, the third internal angle 903 is reduced further to 90°. In method step c) 103, the first internal angle 901 is increased further to 180° and the third internal angle 903 is reduced to 1°. At the same time, the fourth internal angle 904 is increased to 220° and hence the fourth longitudinal fold along the fourth longitudinal crease 207 is produced. Thereafter, the third internal angle 903 and the fourth internal angle 904 are each folded to 180°. Thus, the sheetlike composite 201 has been returned to a flat state. Moreover, in method step c) 103, the second internal angle 902 is reduced to 1° and hence the second longitudinal fold along the second longitudinal crease 205 is produced. In addition, the fourth internal angle 904 is reduced to 3°. The method continues with method step d) 104 as per FIG. 2.

FIG. 4 shows schematic snapshots of a sheetlike composite 201 in method steps b) 102 and c) 103 of a further method according to the invention 100. In addition, the method 100 according to FIG. 4 comprises method steps a) 101 and d) 104, which are configured as method steps a) 101 and d) 104 of the method 100 of FIGS. 1 and 2. In method step b) 102 according to FIG. 4, the first internal angle 901 is first reduced to 90° and hence the first longitudinal fold along the first longitudinal crease 204 is produced. In addition, in method step b) 102, the first internal angle 901 is reduced further to 1° and, at the same time, the third internal angle 903 is reduced to 135° and hence the third longitudinal fold along the third longitudinal crease 206 is produced. In addition, in method step b) 102, the first internal angle 901 is increased to 135° and, at the same time, the third internal angle 903 is reduced further to 90°. In addition, in method step b) 102, the first internal angle 901 is increased further to 180° and the third internal angle 903 is reduced to 1°. Thereafter, the third internal angle 903 is folded to 180°. Thus, the sheetlike composite 201 has been returned to a flat state. In method step c) 103, the second internal angle 902 is reduced to 1° and hence the second longitudinal fold along the second longitudinal crease 205 is produced. In addition, the fourth internal angle 904 is reduced to 3° and hence the fourth longitudinal fold along the fourth longitudinal crease 207 is produced. The process continues with method step d) 104 as per FIG. 2.

FIG. 5 shows a flow diagram of a further method according to the invention 100. The method 100 according to FIG. 5 comprises method steps a) 101 to d) 104, configured as per method steps a) 101 to d) 104 of the method 100 according to FIG. 1. In addition, the method 100 according to FIG. 5 comprises method steps e) 501 to h) 504. In method step e) 501, by folding the sheetlike composite 201 comprised by the container precursor 900 which has been obtained in method step d) 104, a base region 1004 of the container precursor 900 is formed. At this time, regions of the sheetlike composite 201 in which folds are produced along g creases 1002 have a temperature of 24° C. This folding is thus effected in the form of what is called cold folding. In method step f) 502, the base region 1004 is closed by means of sealing by contact with hot air. In method step g) 503, the container precursor 900 is filled with a foodstuff 1101 and, in method step h) 504, by further folding along creases 1002, a top region 1003 of the container precursor 900 is formed and closed by means of sealing with ultrasound.

FIG. 6 shows a flow diagram of a further method according to the invention 100. The method 100 according to FIG. 6 comprises method steps a) 101 to d) 104, configured as per method steps a) 101 to d) 104 of the method 100 according to FIG. 1. In addition, the method 100 according to FIG. 6 comprises method steps e) 501 to h) 504, configured as per method steps e) 501 to h) 504 of the method 100 according to FIG. 5. In addition, the method 100 according to FIG. 6 comprises a method step j) 601 in which the closed container 1100 obtained in method step h) 504 is joined to an opening aid 1102 on the outer face 203. In this case, the closed container 1100 is joined to the opening aid 1102, a cutting ring here, such that the cutting ring can cut through hole-covering layers 1006 which cover a hole 1005 in the carrier layer 704 of the sheetlike composite 201. Thus, the closed container 1100 can easily be opened with the aid of the opening aid 1102. By means of a lid which covers the hole 1005 and the opening aid 1102, the hole 1005 can also be covered again after the opening. The hole 1005 is arranged in the top region 1003 of the closed container 1100.

FIG. 7 shows a detail of a layer sequence of the sheetlike composite 201 of the method 100 according to FIG. 1 in cross section. From the inner face 202 of the sheetlike composite 201 to the outer face 203 of the sheetlike composite 201, the layer sequence comprises an inner polymer layer 701, a barrier layer 702, an adhesion promoter layer 703, a carrier layer 704, an outer polymer layer 705 and, printed thereon, an colour layer 706 which comprises a colourant and constitutes a decoration 706.

FIG. 8 shows a microscope image of a longitudinal crease 204-207 of a sheetlike composite 201 of the inventive container precursor 900 in FIG. 9 in cross section. It is clearly apparent that the carrier layer 704 is split into 2 separate sublayers 801 along the longitudinal crease 204-207. Between the two sublayers 801, the carrier layer 704 forms a cavity 802.

FIG. 9 shows an inventive container precursor 900 in top view (upright). The container precursor 900 consists of a sheetlike composite 201, the layer structure of which is shown in cross section in FIG. 7. In this case, the sheetlike composite 201 is a blank for manufacture of a single container 1100. The container precursor 900 comprises a first longitudinal edge 208 and, opposite that across the sheetlike composite 201, a further longitudinal edge 209. The first longitudinal edge 208 is sealed to the further longitudinal edge 209. This results in formation of a longitudinal seam 210 of the container precursor 900. The longitudinal seam 210 in this container precursor 900 runs through about the middle of a wall area of the container precursor 900. In the case of other inventive container precursors 900, the longitudinal seam 210 may instead run along a longitudinal fold, i.e. along a longitudinal edge 1001 of the container precursor 900. Across the sheetlike composite 201, from the first longitudinal edge 208 to the further longitudinal edge 209, the sheetlike composite 201 comprises a first longitudinal crease 204, a second longitudinal crease 205, a third longitudinal crease 206 and a fourth longitudinal crease 207. Therein, a first longitudinal fold runs along the first longitudinal crease 204, a second longitudinal fold along the second longitudinal crease 205, a third longitudinal fold along the third longitudinal crease 206, and a fourth longitudinal fold along the fourth longitudinal crease 207. The longitudinal folds are each intended to form a longitudinal edge 1001 in the closed container 1100 to be produced. The first longitudinal fold is characterized by a first internal angle 901, the second longitudinal fold by a second internal angle 902, the third longitudinal fold by a third internal angle 903, and the fourth longitudinal fold by a fourth longitudinal angle 904. At the same time, the first internal angle 901 and the third internal angle 903 are each 177°, and the second internal angle 902 and the fourth internal angle 904 are each 3°. Thus, the container precursor 900, in accordance with the invention, is in a flat-folded state. By shaping 1403 of the flat-folded container precursor 900, it can be formed to give a sleeve structure. The shaping 1403 can be effected by simultaneous folding of the first to fourth longitudinal folds as indicated in FIG. 14. The container precursor 900 is obtainable by the method 100 according to FIG. 1.

FIG. 10 shows the container precursor 900 according to FIG. 9 in side view (upright) after the shaping 1403. Thus, the container precursor 900 in FIG. 10 is no longer in a flat-folded state. In the side view shown in FIG. 10, compared to FIG. 9, moreover, a hole 1005 can be seen in a carrier layer 704 of the sheetlike composite 201. The hole 1005 is covered by an adhesion promoter layer 703, a barrier layer 702 and an inner polymer layer 701 as hole-covering layers 1006 on the inner face 202 of the sheetlike composite 201. In addition, further creases 1002 are shown. By folding along the further creases 1002 and joining appropriate parts of the sheetlike composite 201, it is possible to form a top region 1003 and a base region 1004 of a closed container 1100. Also shown here is a longitudinal edge 1001 formed from the fourth longitudinal fold along the fourth longitudinal crease 207.

FIG. 11 shows an inventive closed container 1100. The closed container 1100 was obtained by method steps e) 501 to j) 601 of the method 100 according to FIG. 6. In this case, in method step e) 501, by folding the sheetlike composite 201, a base region 1004 of the container precursor 900 was formed. In method step f) 502, the base region 1004 was sealed by means of sealing by contact with hot air. In method step g) 503, the container precursor 900 was filled with a foodstuff 1101 and, in method step h) 504, by further folding along creases 1002, a top region 1003 of the container precursor 900 was formed and closed by means of sealing with ultrasound. In method step j) 601, the closed container 1100 was joined to an opening aid 1102 on the outer face 203. In this case, a lid of the opening aid 1102 covers the hole 1005.

FIG. 12 shows an inventive apparatus 1200. The apparatus 1200 comprises a sheetlike composite 201 which, from an inner face 202 to an outer face 203, comprises the layer sequence according to FIG. 7. In addition, the sheetlike composite 201, as shown in FIG. 18, comprises a first longitudinal edge 208 and a further longitudinal edge 209. As also shown in FIG. 18, the sheetlike composite 201 comprises, from the first longitudinal edge 208 to the further longitudinal edge 209: a first longitudinal crease 204, a second longitudinal crease 205, a third longitudinal crease 206, and a fourth longitudinal crease 207. Moreover, the apparatus 1200 comprises a transport unit 1201, a roll conveyor here, designed to transport the sheetlike composite 201 from a first folding station 1202 to a longitudinal seam-forming station 1206, in a transport direction 1207. The first folding station 1202 is designed to produce a first longitudinal fold along the first longitudinal crease 204 by reducing a first internal angle 901 which characterizes the first longitudinal fold to 0°. For the aforementioned purpose, the first folding station 1202 partly comprises a continuously revolving belt, wherein the belt rotates about its longitudinal axis along the transport direction 1207 for folding of the sheetlike composite 201 along the first longitudinal crease 204. In addition, the apparatus 1200 comprises a second folding station 1203 designed to produce a third longitudinal fold along the third longitudinal crease 206 by reducing a third internal angle 903 which characterizes the third longitudinal fold to 0°. The second folding station 1203 partly comprises a further continuously revolving belt, wherein this belt rotates about its longitudinal axis along the transport direction 1207 for folding of the sheetlike composite 201 along the third longitudinal crease 206. The second folding station 1203 is arranged so as to overlap the first folding station 1202 in the transport direction 1207. In addition, the apparatus 1200 comprises a third folding station 1204 designed to produce a fourth longitudinal fold along the fourth longitudinal crease 207 by reducing the fourth internal angle 904 which characterizes the fourth longitudinal fold to 0°. The third folding station 1204 is arranged completely beyond the second folding station 1203 in the transport direction 1207. The third folding station 1204 also partly comprises the belt of the second folding station 1203, wherein the belt also rotates about its longitudinal axis along the transport direction 1207 for folding of the sheetlike composite 201 along the fourth longitudinal crease 207. In addition, the apparatus 1200 comprises a fourth folding station 1205 designed to produce a second longitudinal fold along the second longitudinal crease 205 by reducing a second internal angle 902 which characterizes the second longitudinal fold to 0°. The fourth folding station 1205 is arranged completely beyond the second folding station 1203 in the transport direction 1207 and is arranged so as to overlap the third folding station 1204. The fourth folding station 1205 also partly comprises the belt of the first folding station 1202, wherein the belt also rotates about its longitudinal axis along the transport direction 1207 for folding of the sheetlike composite 201 along the second longitudinal crease 205. In addition, the apparatus 1200 comprises a longitudinal seam-forming station 1206, which is a sealing station. The latter is designed to contact and join the first longitudinal edge 208 to the further longitudinal edge 209 by ultrasound sealing thereby obtaining a longitudinal seam 210. For this purpose, the longitudinal seam-forming station 1206 comprises a sonotrode. The longitudinal seam-forming station 1206 is arranged beyond the fourth folding station 1205 in the transport direction 1207. It should also be mentioned that the first internal angle 901, the second internal angle 902, the third internal angle 903 and the fourth internal angle 904 are each on the inner face 202 of the sheetlike composite 201. The first folding station 1202, the second folding station 1203, the third folding station 1204 and the fourth folding station 1205 each comprise two rolls which rotate in opposite senses and are arranged so as to maintain a gap. Therein, the roll pair of the first folding station 1202 is arranged and designed for compression of the first longitudinal fold in the gap of the roll pair at a first internal angle 901 of 0°. In addition, the roll pair of the second folding station 1203 is arranged and designed for compression of the third longitudinal fold in the gap of the roll pair at a third internal angle 903 of 0°. In addition, the roll pair of the third folding station 1204 is arranged and designed for compression of the fourth longitudinal fold in the gap of the roll pair at a fourth internal angle 904 of 0° and the roll pair of the fourth folding station 1205 is arranged and designed for compression of the second longitudinal fold in the gap of the roll pair at a second internal angle 902 of 0°. The apparatus 1200 according to FIG. 12 can be used to conduct the method 100 according to FIG. 4.

FIG. 13 shows a further inventive apparatus 1200. The apparatus 1200 according to FIG. 13 is designed like the apparatus 1200 according to FIG. 12, except that the apparatus 1200 according to FIG. 13 further comprises a fifth folding station 1301. The fifth folding station 1301 is arranged partly after the second folding station 1203 and hence overlapping with the second folding station 1203 in the transport direction 1207. In addition, the fifth folding station 1301 is arranged before the third folding station 1204 in the transport direction 1207. The fifth folding station 1301 is designed to produce the fourth longitudinal fold along the fourth longitudinal crease 207 by increasing the fourth internal angle 904 from 180° to 220°. The apparatus 1200 according to FIG. 13 can be used to conduct the method 100 according to FIG. 3.

FIG. 14 shows a test setup 1400 for measurement of the shaping force. In this setup, the container precursor 900 according to FIG. 9 is clamped between two compression plates 1401 of a compression plate system of a universal strength tester. The compression plate system is motor-driven, such that the upper compression plate 1401 can perform a uniform downward motion 1402. As a result, shaping 1403 of the container precursor 900 from the flat-folded state takes place to give a sleeve structure. Further details relating to the measurement are reported under the "Shaping force" test method.

FIG. 15a) shows a holding clamp 1500. The holding clamp 1500 was developed in-house and serves to conduct the above-described test method for the zero sample force. FIG. 15a) shows a section A-A through the holding clamp 1500. The holding clamp 1500 more particularly comprises a holding plate 1, a clamp 2, a lever 3, a shell 4, a spacer ring 5, a bolt 6, a cylinder pin 7 and a compression spring 8.

FIG. 15b) shows the holding clamp 1500 according to FIG. 15a) in a further view. What is shown is a section B-B through the holding clamp 1500.

FIG. 16a) shows the holding clamp according to FIG. 15a) in a further view with dimensions in mm.

FIG. 16b) shows the holding clamp 1500 according to FIG. 15a) with a turntable 1601. The holding clamp 1500 and the turntable 1601 are used in this arrangement for the "zero sample force" test method as described above.

FIG. 17a) shows the holding clamp 1500 according to FIG. 15a) in a further view.

FIG. 17b) shows the holding clamp 1500 according to FIG. 15a) in a perspective view.

FIG. 18 shows the creased and unfolded sheetlike composite 201 from method step a) 101 of the method 100 according to FIG. 1 in a view of the inner face 202. This shows, from left to right, across the sheetlike composite 201: the first longitudinal edge 208, the first longitudinal crease 204, the second longitudinal crease 205, the third longitudinal crease 206, the fourth longitudinal crease 207 and the further longitudinal edge 209.

LIST OF REFERENCE NUMERALS

100 method according to the invention
101 method step a)
102 method step b)
103 method step c)
104 method step d)
201 sheetlike composite
202 inner face
203 outer face
204 first longitudinal crease
205 second longitudinal crease
206 third longitudinal crease
207 fourth longitudinal crease
208 first longitudinal edge
209 further longitudinal edge
210 longitudinal seam
501 method step e)
502 method step f)
503 method step g)
504 method step h)
601 method step j)
701 inner polymer layer
702 barrier layer
703 adhesion promoter layer
704 carrier layer
705 outer polymer layer
706 colour layer/decoration
801 sublayer
802 cavity
900 container precursor according to the invention
901 first internal angle
902 second internal angle
903 third internal angle
904 fourth internal angle
1001 longitudinal edge
1002 crease
1003 top region
1004 base region
1005 hole
1006 hole-covering layers
1100 closed container according to the invention
1101 foodstuff
1102 opening aid
1200 apparatus according to the invention
1201 transport unit
1202 first folding station
1203 second folding station
1204 third folding station
1205 fourth folding station
1206 longitudinal seam-forming station
1207 transport direction
1301 fifth folding station
1400 test setup for measurement of the shaping force
1401 compression plate
1402 uniform compression plate motion
1403 shaping
1500 holding clamp
1 holding plate
2 clamp
3 lever
4 shell
5 spacer ring
6 bolt
7 cylinder pin
8 compression spring
1601 turntable

The invention claimed is:

1. A method comprising, as method steps,
a) providing a sheetlike composite comprising, as mutually superposed layers of a layer sequence, from an inner face of the sheetlike composite to an outer face of the sheetlike composite
i) an inner polymer layer,
ii) a barrier layer, and
iii) a carrier layer,
wherein the sheetlike composite includes a first longitudinal edge and a further longitudinal edge,
wherein the first longitudinal edge lies opposite the further longitudinal edge,
wherein the sheetlike composite includes, in the following sequence in the direction from the first longitudinal edge to the further longitudinal edge:
i. a first longitudinal crease,
ii. a second longitudinal crease,
iii. a third longitudinal crease, and
iv. a fourth longitudinal crease;
b) producing a first longitudinal fold along the first longitudinal crease and a third longitudinal fold along the third longitudinal crease,
wherein the first longitudinal fold is characterized by a first angle,
wherein the third longitudinal fold is characterized by a third angle;
c) producing a second longitudinal fold along the second longitudinal crease and a fourth longitudinal fold along the fourth longitudinal crease,
wherein the second longitudinal fold is characterized by a second angle,
wherein the fourth longitudinal fold is characterized by a fourth angle; and
d) contacting and joining the first longitudinal edge to the further longitudinal edge, thereby obtaining a longitudinal seam,
wherein the first angle, the second angle, the third angle and the fourth angle are each on the inner face of the sheetlike composite,
wherein
the production of the first longitudinal fold in method step b) comprises reducing the first angle from more than 15° to not more than 15°,
the production of the third longitudinal fold in method step b) comprises reducing the third angle from more than 15° to not more than 15°,
the production of the second longitudinal fold in method step c) comprises reducing the second angle from more than 15° to not more than 15°, and
the fourth angle is reduced from more than 15° to not more than 15° for producing the fourth longitudinal fold or after producing the fourth longitudinal fold, in any case in method step c),
wherein producing a fold along a crease comprises folding along the crease such that an angle formed by fold regions of the sheetlike composite that are adjacent along the crease differs by at least 10° from an initial angle of 180° for a first time,
wherein after production of the first longitudinal fold the first angle is increased to at least 165°,
wherein after production of the third longitudinal fold the third angle is increased to at least 165°, wherein the increase in the first angle and the third angle is done before the fourth angle is reduced from more than 15° to not more than 15° in method step c).

2. The method according to claim 1, wherein the method is a method of producing a sleeve-like container precursor for a single container.

3. The method according to claim 1, wherein the production of the fourth longitudinal fold in method step c) comprises increasing the fourth angle from less than 190° to at least 190° before reducing the fourth angle to not more than 15° in method step c).

4. The method according to claim 1, wherein a container precursor is obtained in method step d),
wherein the method comprises, as further method steps,
e) forming a base region of the container precursor by folding the sheetlike composite;
f) closing the base region;
g) filling the container precursor with a foodstuff; and
h) closing the container precursor in a top region thereby obtaining a closed container.

5. A container precursor obtainable by a method comprising, as method steps,
a) providing a sheetlike composite comprising, as mutually superposed layers of a layer sequence, from an inner face of the sheetlike composite to an outer face of the sheetlike composite
  i) an inner polymer layer,
  ii) a barrier layer, and
  iii) a carrier layer,
  wherein the sheetlike composite includes a first longitudinal edge and a further longitudinal edge,
  wherein the first longitudinal edge lies opposite the further longitudinal edge,
  wherein the sheetlike composite includes, in the following sequence in the direction from the first longitudinal edge to the further longitudinal edge:
    i. a first longitudinal crease,
    ii. a second longitudinal crease,
    iii. a third longitudinal crease, and
    iv. a fourth longitudinal crease;
b) producing a first longitudinal fold along the first longitudinal crease and a third longitudinal fold along the third longitudinal crease,
  wherein the first longitudinal fold is characterized by a first angle,
  wherein the third longitudinal fold is characterized by a third angle;
c) producing a second longitudinal fold along the second longitudinal crease and a fourth longitudinal fold along the fourth longitudinal crease,
  wherein the second longitudinal fold is characterized by a second angle,
  wherein the fourth longitudinal fold is characterized by a fourth angle; and
d) contacting and joining the first longitudinal edge to the further longitudinal edge thereby obtaining a longitudinal seam,
  wherein the first angle, the second angle, the third angle and the fourth angle are each on the inner face of the sheetlike composite,
  wherein
  the production of the first longitudinal fold in method step b) comprises reducing the first angle from more than 15° to not more than 15°,
  the production of the third longitudinal fold in method step b) comprises reducing the third angle from more than 15° to not more than 15°, the production of the second longitudinal fold in method step c) comprises reducing the second angle from more than 15° to not more than 15°, and
  the fourth angle is reduced from more than 15° to not more than 15° in method step c),
  wherein producing a fold along a crease comprises folding along the crease such that an angle formed by fold regions of the sheetlike composite that are adjacent along the crease differs by at least 10° from an initial angle of 180° for a first time,
  wherein after production of the first longitudinal fold the first angle is increased to at least 165°,
  wherein after production of the third longitudinal fold the third angle is increased to at least 165°,
  wherein the increase in the first angle and the third angle is done before the fourth angle is reduced from more than 15° to not more than 15° in method step c).

6. The container precursor according to claim 5, wherein the first angle and the third internal angle are each at least 165°;
  wherein the second angle and the fourth angle are each not more than 15°;
  wherein the container precursor can be shaped to give a sleeve-like structure by folding along the first longitudinal crease, the second longitudinal crease, the third longitudinal crease and the fourth longitudinal crease;
  wherein the container precursor is characterized by a shaping coefficient in a range from 8 to 30 m²/kg,
  wherein the shaping coefficient is defined by Shaping coefficient=shaping force/(zero sample force·grammage)

wherein the zero sample force is measured according to DIN 55437-3:2008-05 and DIN 53121:2014-08 as maximum force value, which is obtained by bending uncreased samples of the sheetlike composite with a sample size of 60 mm×25 mm by 150°,
  wherein the shaping force is determined by a Compression test method according to DIN EN ISO 12048: 2000.

7. A closed container obtainable by a method comprising, as method steps,
a) providing a sheetlike composite comprising, as mutually superposed layers of a layer sequence, from an inner face of the sheetlike composite to an outer face of the sheetlike composite
  i) an inner polymer layer,
  ii) a barrier layer, and
  iii) a carrier layer,
  wherein the sheetlike composite includes a first longitudinal edge and a further longitudinal edge,
  wherein the first longitudinal edge lies opposite the further longitudinal edge,
  wherein the sheetlike composite includes, in the following sequence in the direction from the first longitudinal edge to the further longitudinal edge:
    i. a first longitudinal crease,
    ii. a second longitudinal crease,
    iii. a third longitudinal crease, and
    iv. a fourth longitudinal crease;
b) producing a first longitudinal fold along the first longitudinal crease and a third longitudinal fold along the third longitudinal crease,
  wherein the first longitudinal fold is characterized by a first angle,
  wherein the third longitudinal fold is characterized by a third angle;

c) producing a second longitudinal fold along the second longitudinal crease and a fourth longitudinal fold along the fourth longitudinal crease,
wherein the second longitudinal fold is characterized by a second angle,
wherein the fourth longitudinal fold is characterized by a fourth angle; and
d) contacting and joining the first longitudinal edge to the further longitudinal edge thereby obtaining a longitudinal seam and a container precursor,
e) forming a base region of the container precursor by folding the sheetlike composite;
f) closing the base region;
g) filling the container precursor with a foodstuff; and
h) closing the container precursor in a top region thereby obtaining a closed container,
wherein the first angle, the second angle, the third angle and the fourth angle are each on the inner face of the sheetlike composite,
wherein
the production of the first longitudinal fold in method step b) comprises reducing the first angle from more than 15° to not more than 15°,
the production of the third longitudinal fold in method step b) comprises reducing the third angle from more than 15° to not more than 15°,
the production of the second longitudinal fold in method step c) comprises reducing the second angle from more than 15° to not more than 15°, and
the fourth angle is reduced from more than 15° to not more than 15° in method step c),
wherein producing a fold along a crease comprises folding along the crease such that an angle formed by fold regions of the sheetlike composite that are adjacent along the crease differs by at least 10° from an initial angle of 180° for a first time,
wherein after production of the first longitudinal fold, the first angle is increased to at least 165°,
wherein after production of the third longitudinal fold, the third angle is increased to at least 165°,
wherein the increase in the first angle and the third angle is done before the fourth angle is reduced from more than 15° to not more than 15° in method step c).

8. An apparatus comprising, as constituents,
a) a sheetlike composite comprising, as mutually superposed layers of a layer sequence, from an inner face of the sheetlike composite to an outer face of the sheetlike composite
  i) an inner polymer layer,
  ii) a barrier layer, and
  iii) a carrier layer,
  wherein the sheetlike composite includes a first longitudinal edge and a further longitudinal edge,
  wherein the first longitudinal edge lies opposite the further longitudinal edge,
  wherein the sheetlike composite includes, in the following sequence in the direction from the first longitudinal edge to the further longitudinal edge:
  i. a first longitudinal crease,
  ii. a second longitudinal crease,
  iii. a third longitudinal crease, and
  iv. a fourth longitudinal crease;
b) a transport unit designed to transport the sheetlike composite in a transport direction;
c) a first folding station designed to produce a first longitudinal fold along the first longitudinal crease, to reduce a first angle from more than 15° to not more than 15°, and to subsequently increase the first angle to at least 165°,
  wherein the first longitudinal fold is characterized by the first angle;
d) a second folding station designed to produce a third longitudinal fold along the third longitudinal crease, to reduce the third angle from more than 15° to not more than 15°, and to subsequently increase the third angle to at least 165°,
  wherein the third longitudinal fold is characterized by a third angle;
e) a third folding station designed to fold along a fourth longitudinal fold along the fourth longitudinal crease and to reduce the fourth angle from more than 15° to not more than 15°,
  wherein the fourth longitudinal fold is characterized by a fourth angle,
  wherein the third folding station is arranged beyond the second folding station in the transport direction;
f) a fourth folding station designed to produce a second longitudinal fold along the second longitudinal crease and to reduce the second angle from more than 15° to not more than 15°,
  wherein the second longitudinal fold is characterized by a second angle,
  wherein the fourth folding station is arranged beyond the second folding station in the transport direction; and
g) a longitudinal seam-forming station designed to contact and join the first longitudinal edge to the further longitudinal edge thereby obtaining a longitudinal seam,
  wherein the longitudinal seam-forming station is arranged beyond the fourth folding station in the transport direction,
wherein the first angle, the second angle, the third angle and the fourth angle are each on the inner face of the sheetlike composite,
wherein producing a fold along a crease comprises folding along the crease such that an angle formed by fold regions of the sheetlike composite that are adjacent along the crease differs by at least 10° from an initial angle of 180° for a first time.

9. The apparatus according to claim 8, wherein the apparatus includes a further folding station designed to produce the fourth longitudinal fold along the fourth longitudinal crease,
  wherein the further folding station is arranged before the third folding station in the transport direction.

10. A use of the apparatus according to claim 8 for manufacture of a container precursor.

* * * * *